United States Patent
Bhattad et al.

(10) Patent No.: US 11,470,459 B2
(45) Date of Patent: Oct. 11, 2022

(54) BANDWIDTH SELECTION FOR ENHANCED MACHINE-TYPE-COMMUNICATIONS

(71) Applicant: QUALCOMM Incorporated, San Diego, CA (US)

(72) Inventors: Kapil Bhattad, Bangalore (IN); Gowrisankar Somichetty, Bangalore (IN); Alberto Rico Alvarino, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/586,582

(22) Filed: Sep. 27, 2019

(65) Prior Publication Data

US 2020/0029193 A1    Jan. 23, 2020

Related U.S. Application Data

(62) Division of application No. 15/789,631, filed on Oct. 20, 2017, now Pat. No. 10,462,629.

(30) Foreign Application Priority Data

Feb. 2, 2017  (IN) .............................. 201741003881

(51) Int. Cl.
  *H04W 4/70*    (2018.01)
  *H04W 72/04*   (2009.01)
  (Continued)

(52) U.S. Cl.
  CPC ........... *H04W 4/70* (2018.02); *H04W 72/048* (2013.01); *H04W 8/22* (2013.01); *H04W 24/08* (2013.01);
  (Continued)

(58) Field of Classification Search
  CPC . H04W 4/70; H04W 72/048; H04W 72/0453; H04W 24/08; H04W 28/20; H04W 8/22
  See application file for complete search history.

(56) References Cited

U.S. PATENT DOCUMENTS 10,462,629 B2   10/2019  Bhattad et al.
2009/0303941 A1*  12/2009  Naka ................. H04W 72/0406
                                                   370/329

(Continued)

FOREIGN PATENT DOCUMENTS

CN  101820682 A   9/2010
EP  2928246 A1   10/2015
(Continued)

OTHER PUBLICATIONS

Fujitsu: "On MTC Band Allocation," 3GPP Draft; R1-134344 MTC Band Clarification, 3rd Generation Partnership Project (3GPP), Mobile Competence Centre; 650, Route Des Lucioles; F-06921 Sophia-Antipolis Cedex; France, vol. RAN WG1, No. Guangzhou; Oct. 7, 2013-Oct. 11, 2013, Sep. 28, 2013 (Sep. 28, 2013), XP050717486, pp. 1-3, Retrieved from the Internet: URL: http://www.3gpp.org/ftp/tsg_ran/WG1_RL1/TSGR1_74b/Docs/ [retrieved on Sep. 28, 2013].

(Continued)

*Primary Examiner* — Wayne H Cai
(74) *Attorney, Agent, or Firm* — Qualcomm Incorporated

(57) ABSTRACT

Methods, systems, and devices for wireless communication are described. A wireless device may receive a scheduling indicator on a first instance of a control channel. The wireless device may determine that a data transmission is scheduled for the wireless device based at least in part on the received scheduling indicator. The wireless device may identify a first frequency band associated with the data transmission and a second frequency band associated with a second instance of the control channel. The wireless device (Continued)

may identify a third frequency band to monitor based at least in part on the first and second frequency bands and a bandwidth capability of the wireless device. The third frequency band includes the first frequency band. The third frequency band comprises an associated bandwidth that is based at least in part on the bandwidth capability of the wireless device.

20 Claims, 15 Drawing Sheets

(51) Int. Cl.
  *H04W 24/08* (2009.01)
  *H04W 28/20* (2009.01)
  *H04W 8/22* (2009.01)
(52) U.S. Cl.
  CPC ........ *H04W 28/20* (2013.01); *H04W 72/0453* (2013.01)

(56) References Cited

U.S. PATENT DOCUMENTS

| | | | |
|---|---|---|---|
| 2011/0292906 A1 | 12/2011 | Ren et al. | |
| 2013/0172001 A1* | 7/2013 | Gerlach | H04W 52/343 |
| | | | 455/450 |
| 2015/0195781 A1* | 7/2015 | Yi | H04W 52/143 |
| | | | 455/452.2 |
| 2015/0230249 A1 | 8/2015 | Nguyen et al. | |
| 2018/0049108 A1* | 2/2018 | Yang | H04L 47/2475 |
| 2018/0049180 A1* | 2/2018 | Lee | H04W 72/048 |
| 2018/0049201 A1* | 2/2018 | Hussain | H04L 5/0053 |
| 2018/0220257 A1 | 8/2018 | Bhattad et al. | |
| 2019/0037377 A1* | 1/2019 | Ke | H04W 48/14 |
| 2020/0187188 A1* | 6/2020 | Tabet | H04W 72/1284 |

FOREIGN PATENT DOCUMENTS

| | | |
|---|---|---|
| EP | 2928246 A1 | 10/2015 |
| KR | 20150092136 A | 8/2015 |
| WO | WO2016164739 A1 | 10/2016 |
| WO | WO-2016164739 A1 | 10/2016 |

OTHER PUBLICATIONS

International Search Report and Written Opinion—PCT/US2018/016502—ISA/EPO—dated Jun. 29, 2018.
Partial International Search Report—PCT/US2018/016502—ISA/EPO—dated May 9, 2018.
ZTE: "Detailed Solutions to Support Larger PDSCH/PUSCH Bandwidth for MTC", 3GPP Draft; R1-1612593 Support of Larger Channel Bandwidth, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 14, 2016-Nov. 18, 2016 Nov. 13, 2016, XP051176538, Retrieved from the Internet: URL:http://www.3gpp.org/ftp/Meetings_3GPP_SYNC/RAN1/Docs/ [retrieved on Nov. 13, 2016], 6 pages.
Taiwan Search Report—TW107103781—TIPO—dated Jul. 9, 2020.
Ericsson, et al., "WF on Parallel Reception for UE with Larger Bandwidth in FeMTC", 3GPP TSG-RAN WG1 Meeting #88, R1-1703856, 3GPP, Athens, Greece, Feb. 16, 2017, 2 Pages.
Fujitsu: "On MTC Band Allocation", 3GPP TSG-RAN WG1 Meeting #74bis, 3GPP Draft; R1-134344 MTC Band Clarification, 3rd Generation Partnership Project (3GPP), Mobile Competence Centre; 650, Route Des Lucioles; F-06921 Sophia-Antipolis Cedex; France, vol. RAN WG1, No. Guangzhou; Oct. 7, 2013-Oct. 11, 2013, Sep. 28, 2013 (Sep. 28, 2013), pp. 1-3, XP050717486, Retrieved from the Internet: URL: http://www.3gpp.org/ftp/tsg_ran/WG1_RL1/TSGR1_74b/Docs/ [retrieved on Sep. 28, 2013].
QUALCOMM Incorporated: "Support of Larger Data Channel Bandwidth", 3GPP TSG RAN WG1 Meeting #86, R1-166297, Gothenburg, Sweden, Aug. 22-26, 2016, pp. 1-3.
ZTE: "Detailed Solutions to Support Larger PDSCH/PUSCH Bandwidth for MTC", 3GPP TSG RAN WG1 Meeting #87, 3GPP Draft; R1-1612593 Support of Larger Channel Bandwidth, 3rd Generation Partnership Project (3GPP), Mobile Competence Centre, 650, Route Des Lucioles, F-06921 Sophia-Antipolis Cedex, France, vol. RAN WG1, No. Reno, USA; Nov. 14, 2016-Nov. 18, 2016, Nov. 13, 2016, 6 Pages, XP051176538, Retrieved from the Internet: URL: http://www.3gpp.org/ftp/Meetings_3GPP_SYNC/RAN1/Docs/ [retrieved on Nov. 13, 2016].
Ericsson: "Cat-M1 UE-Selected Subband CQI Reporting Test" [online], 3GPP TSG-RAN WG4#79, R4-163588, May 27, 2016, pp. 1-5, Retrieved from the Internet URL:http://www.3gpp.org/ftp/tsg_ran/WG4_Radio/TSGR4_79/Docs/R4-163588.zip.

\* cited by examiner

BANDWIDTH SELECTION FOR ENHANCED MACHINE-TYPE-COMMUNICATIONS

CROSS REFERENCES

The present Application for Patent is a Divisional of U.S. patent application Ser. No. 15/789,631 by Bhattad, et al., entitled, "BANDWIDTH SELECTION FOR ENHANCED MACHINE-TYPE-COMMUNICATIONS" filed Oct. 20, 2017, which claims priority to India Provisional Patent Application No. 201741003881 by Bhattad, et al., entitled "BANDWIDTH SELECTION FOR ENHANCED MACHINE-TYPE-COMMUNICATIONS," filed Feb. 2, 2017, assigned to the assignee hereof, and expressly incorporated herein.

BACKGROUND

The following relates generally to wireless communication, and more specifically to bandwidth selection for enhanced machine-type-communications.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

Some wireless communication systems may support communications between base stations and different types of narrowband device types. For example, in enhanced machine-type communications (eMTC) and narrowband-Internet of Things (NB-IoT) deployments, mobile devices may communicate with a base station (or other serving station) using resources allocated specifically for one deployment or the other. Such systems may be associated with, for example, bandwidth (or frequency band) configurations that are designed to minimize power usage of the narrowband devices, are responsive to narrowband devices typically having a limited amount of information to communicate, etc.

In some aspects, some wireless communication systems supporting narrowband communication configurations, such as NB-IoT and eMTC, may have different available bandwidths for different types of channels used for communication. As one non-limiting example, such wireless communication systems may have one bandwidth (or frequency band(s)) available for the wireless devices to monitor certain channels (e.g., control channels) and a different bandwidth (or frequency band(s)) available for the wireless devices to exchange data (e.g., in a data channel).

SUMMARY

The described techniques relate to improved methods, systems, devices, or apparatuses that support bandwidth selection for eMTC communications. In some examples, the techniques described herein provide for identifying, based on a bandwidth capability of the UE, a frequency band within which a UE is capable of simultaneously monitoring a data channel and at least a portion of an instance of a control channel. Transmissions may be scheduled to the UE accounting for bandwidth capabilities of the UE to improve management of expected traffic load, to account for power constraints of the UE, to manage data transmission latency, or the like.

Generally, the described techniques provide for a UE, such as a eMTC configured UE, to determine a bandwidth in which to monitor control channel(s) based on the bandwidth capability of the UE, the bandwidth associated with a data transmission to the UE, and the like. For example, the UE may receive a scheduling indication on a first instance of a control channel, e.g., a machine physical downlink control channel (MPDCCH). In some examples, the UE may determine that a data transmission is scheduled for the UE based on the scheduling indication, and use the scheduling indication for identifying a frequency band that the UE is capable of simultaneously monitoring a data channel and at least a portion of an instance of a control channel.

For example, the UE may identify a first frequency band for the data transmission and a second frequency band for a second instance of the control channel. The UE may identify a third frequency band in which to monitor the second instance of the control channel based on the bandwidth capability of the UE and the first and second frequency bands. The third frequency band may include the first frequency band and may have a bandwidth that is based on the bandwidth capability of the UE. The UE may receive the data transmission in the first frequency band and a portion of the second instance of the control channel in the second frequency band. The second frequency band may overlap with the third frequency band. The UE may monitor for a data transmission within a data channel and at least a portion of an instance of a control channel, where the data channel and the at least a portion of the instance of the control channel is within the third frequency band.

Beneficially, the UE may be capable of simultaneously receiving the data transmission scheduled by the received scheduling indicator and a subsequent scheduling indicator within the at least a portion of the instance of the control channel. Because each of the data transmission and the subsequent scheduling indicator are transmitted within a frequency band the UE is capable of monitoring, the UE may identify a subsequent data transmission scheduled by the subsequent scheduling indicator and attempt to receive the subsequent data transmission, thereby reducing data transmission latency.

In other aspects, the described techniques provide for a base station, such as an eMTC configured base station, to determine a bandwidth mode that can be used for a particular UE based on what bandwidth the UE can support, various traffic parameters, and the like. For example, the base station may identify the bandwidth capability of the UE. The base station may also identify traffic parameters associated with a eMTC communications over the medium and for cellular communications over the medium. The base station may select a bandwidth for a data transmission with the UE (e.g., uplink or downlink) based on the UE's supported bandwidth and the traffic conditions. The base station may transmit, within the selected bandwidth, at least a portion of an instance of a control channel and a data transmission in a data channel, enabling the UE to simultaneously monitor the at least a portion of the instance of the control channel and the data channel.

A method of wireless communication is described. The method may include receiving, at a wireless device, a scheduling indicator on a first instance of a control channel, determining that a data transmission is scheduled for the wireless device based at least in part on the received scheduling indicator, identifying a first frequency band associated with the data transmission, identifying a second frequency band associated with a second instance of the control channel, identifying a third frequency band to monitor based at least in part on the first and second frequency bands and a bandwidth capability of the wireless device, wherein the third frequency band includes the first frequency band, and wherein the third frequency band comprises an associated bandwidth that is based at least in part on the bandwidth capability of the wireless device, and receiving the data transmission in the first frequency band and a portion of the second instance of the control channel in the second frequency band that overlaps with the third frequency band.

An apparatus for wireless communication is described. The apparatus may include means for receiving, at a wireless device, a scheduling indicator on a first instance of a control channel, means for determining that a data transmission is scheduled for the wireless device based at least in part on the received scheduling indicator, means for identifying a first frequency band associated with the data transmission, means for identifying a second frequency band associated with a second instance of the control channel, means for identifying a third frequency band to monitor based at least in part on the first and second frequency bands and a bandwidth capability of the wireless device, wherein the third frequency band includes the first frequency band, and wherein the third frequency band comprises an associated bandwidth that is based at least in part on the bandwidth capability of the wireless device, and means for receiving the data transmission in the first frequency band and a portion of the second instance of the control channel in the second frequency band that overlaps with the third frequency band.

Another apparatus for wireless communication is described. The apparatus may include a processor, memory in electronic communication with the processor, and instructions stored in the memory. The instructions may be operable to cause the processor to receive, at a wireless device, a scheduling indicator on a first instance of a control channel, determine that a data transmission is scheduled for the wireless device based at least in part on the received scheduling indicator, identify a first frequency band associated with the data transmission, identify a second frequency band associated with a second instance of the control channel, identify a third frequency band to monitor based at least in part on the first and second frequency bands and a bandwidth capability of the wireless device, wherein the third frequency band includes the first frequency band, and wherein the third frequency band comprises an associated bandwidth that is based at least in part on the bandwidth capability of the wireless device, and receive the data transmission in the first frequency band and a portion of the second instance of the control channel in the second frequency band that overlaps with the third frequency band.

A non-transitory computer readable medium for wireless communication is described. The non-transitory computer-readable medium may include instructions operable to cause a processor to receive, at a wireless device, a scheduling indicator on a first instance of a control channel, determine that a data transmission is scheduled for the wireless device based at least in part on the received scheduling indicator, identify a first frequency band associated with the data transmission, identify a second frequency band associated with a second instance of the control channel, identify a third frequency band to monitor based at least in part on the first and second frequency bands and a bandwidth capability of the wireless device, wherein the third frequency band includes the first frequency band, and wherein the third frequency band comprises an associated bandwidth that is based at least in part on the bandwidth capability of the wireless device, and receive the data transmission in the first frequency band and a portion of the second instance of the control channel in the second frequency band that overlaps with the third frequency band.

In some examples of the method, apparatus, and non-transitory computer-readable medium described above, the second frequency band may be a frequency band region that includes a set of resource blocks allocated to the control channel.

In some examples of the method, apparatus, and non-transitory computer-readable medium described above, the second frequency band may be a frequency band region that includes at least some resource blocks allocated to a control channel search space of the control channel.

In some examples of the method, apparatus, and non-transitory computer-readable medium described above, the second frequency band is a narrowband bandwidth of the control channel.

In some examples of the method, apparatus, and non-transitory computer-readable medium described above, the first frequency band is a frequency band region that includes a set of resource blocks assigned to the data transmission.

In some examples of the method, apparatus, and non-transitory computer-readable medium described above, the first frequency band is a narrowband bandwidth of a set of resource block assigned to the data transmission.

In some examples of the method, apparatus, and non-transitory computer-readable medium described above, the first and second frequency bands hop across a plurality of subframes based on a predefined hopping pattern. In some cases, the third frequency band may be identified in each subframe of the plurality of subframes.

Some examples of the method, apparatus, and non-transitory computer-readable medium described above may further include processes, features, means, or instructions for monitoring the control channel based at least in part on one or more observations of a portion of the control channel. In some cases, the portion of the control channel may be a subset of subframes associated with the third frequency band that overlaps at least a portion of the second frequency band.

Some examples of the method, apparatus, and non-transitory computer-readable medium described above may further include processes, features, means, or instructions for monitoring the control channel, and ceasing to monitor the control channel based at least in part on at least one subframe associated with the third frequency band not overlapping a subframe of the control channel in the second frequency band.

Some examples of the method, apparatus, and non-transitory computer-readable medium described above may further include processes, features, means, or instructions for monitoring the control channel, add ceasing to monitor the control channel based at least in part on at least one subframe associated with the third frequency band not overlapping a subframe of a control channel search space of the control channel in the second frequency band.

In some examples of the method, apparatus, and non-transitory computer-readable medium described above, a first predefined hopping pattern of the one or more predefined hopping patterns that corresponds to a set of subframes associated with the data transmission may be different from a second predefined hopping pattern of the one or more predefined hopping patterns that corresponds to a set of subframes associated with the control channel. In some cases, a predefined hopping pattern may comprise the first frequency band hopping across a subframes different from the subframes that the second frequency band hops across.

Some examples of the method, apparatus, and non-transitory computer-readable medium described above may further include processes, features, means, or instructions for identifying a predefined frequency band configuration associated with the wireless device. Some examples of the method, apparatus, and non-transitory computer-readable medium described above may further include processes, features, means, or instructions for identifying the third frequency band such that it includes the first and second frequency bands when the first and second frequency bands may be within the predefined frequency band configuration.

In some examples of the method, apparatus, and non-transitory computer-readable medium described above, the predefined frequency band configuration may be obtained by dividing a system bandwidth into non-overlapping subbands with bandwidth equal to the bandwidth capability of the wireless device.

In some examples of the method, apparatus, and non-transitory computer-readable medium described above, the third frequency band may be identified to maximize the overlap with the second frequency band.

In some examples of the method, apparatus, and non-transitory computer-readable medium described above, the third frequency band may be the same as the first frequency band.

In some examples of the method, apparatus, and non-transitory computer-readable medium described above, the frequency band for the control channel comprises a 1.4 megahertz (MHz) bandwidth.

In some examples of the method, apparatus, and non-transitory computer-readable medium described above, the bandwidth capability associated with the data transmission comprises one of a 5 MHz bandwidth or a 20 MHz bandwidth.

A method of wireless communication is described. The method may include identifying a bandwidth capability of a wireless device, determining a first traffic parameter for cellular communications over a wireless medium and a second traffic parameter for machine-type communications (MTC) over the wireless medium, and selecting a bandwidth for a data transmission associated with the wireless device, the selection based at least in part on the identified bandwidth capability of the wireless device and the first traffic load parameter and the second traffic load parameter.

An apparatus for wireless communication is described. The apparatus may include means for identifying a bandwidth capability of a wireless device, means for determining a first traffic parameter for cellular communications over a wireless medium and a second traffic parameter for MTC over the wireless medium, and means for selecting a bandwidth for a data transmission associated with the wireless device, the selection based at least in part on the identified bandwidth capability of the wireless device and the first traffic load parameter and the second traffic load parameter.

Another apparatus for wireless communication is described. The apparatus may include a processor, memory in electronic communication with the processor, and instructions stored in the memory. The instructions may be operable to cause the processor to identify a bandwidth capability of a wireless device, determine a first traffic parameter for cellular communications over a wireless medium and a second traffic parameter for MTC over the wireless medium, and select a bandwidth for a data transmission associated with the wireless device, the selection based at least in part on the identified bandwidth capability of the wireless device and the first traffic load parameter and the second traffic load parameter.

A non-transitory computer readable medium for wireless communication is described. The non-transitory computer-readable medium may include instructions operable to cause a processor to identify a bandwidth capability of a wireless device, determine a first traffic parameter for cellular communications over a wireless medium and a second traffic parameter for MTC over the wireless medium, and select a bandwidth for a data transmission associated with the wireless device, the selection based at least in part on the identified bandwidth capability of the wireless device and the first traffic load parameter and the second traffic load parameter.

Some examples of the method, apparatus, and non-transitory computer-readable medium described above may further include processes, features, means, or instructions for determining an available transmit power for the data transmission from the wireless device, wherein the selection of the bandwidth may be based at least in part on the available transmit power.

Some examples of the method, apparatus, and non-transitory computer-readable medium described above may further include processes, features, means, or instructions for determining a pathloss value associated with the wireless device, wherein the selection of the bandwidth may be based at least in part on the pathloss value.

Some examples of the method, apparatus, and non-transitory computer-readable medium described above may further include processes, features, means, or instructions for determining that one of an available transmit power or a pathloss value associated with the wireless device may be below a threshold value. Some examples of the method, apparatus, and non-transitory computer-readable medium described above may further include processes, features, means, or instructions for selecting a narrowband bandwidth for the data transmission associated with the wireless device.

DETAILED DESCRIPTION

Figure 1:
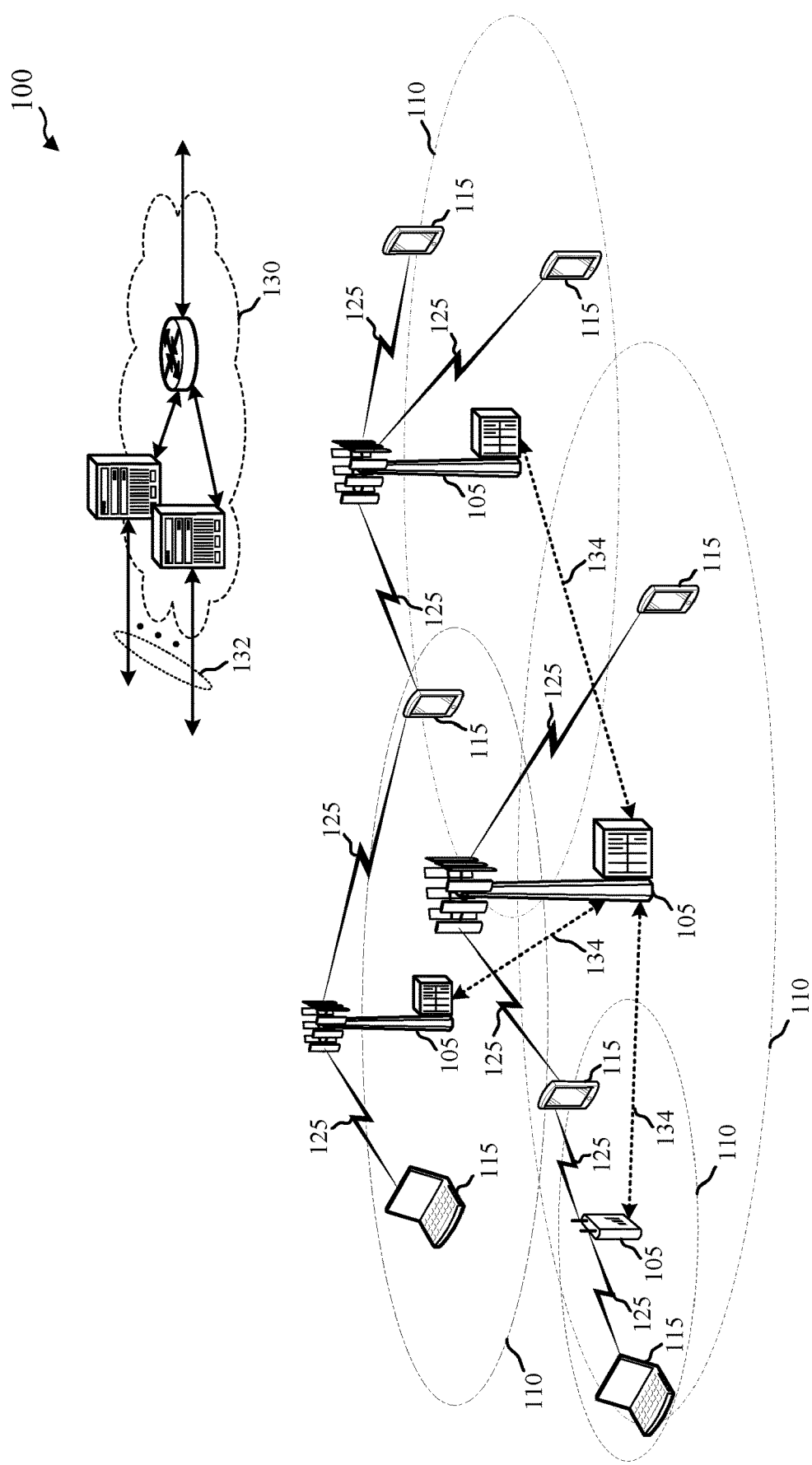
FIG. 1 illustrates an example of a system for wireless communication that supports bandwidth selection for eMTC communications in accordance with aspects of the present disclosure.

The described techniques relate to improved methods, systems, devices, or apparatuses that support bandwidth selection for eMTC communications. In some examples, the techniques described herein provide for identifying, based on a bandwidth capability of the UE, a frequency band within which a UE is capable of simultaneously monitoring a data channel and at least a portion of an instance of a control channel. Transmissions may be scheduled to the UE accounting for bandwidth capabilities of the UE to improve management of expected traffic load, to account for power constraints of the UE, or the like. A UE may monitor for a data transmission within a data channel and at least a portion of an instance of the control channel, where the data channel and the at least a portion of the instance of the control channel are within a frequency band the UE is capable of monitoring.

Beneficially, the UE may be capable of simultaneously receiving a data transmission scheduled by a previously received scheduling indicator and a subsequent scheduling indicator within the at least a portion of the instance of the control channel. Because each of the data transmission and the subsequent scheduling indicator are transmitted within a frequency band the UE is capable of monitoring, the UE may identify a subsequent data transmission scheduled by the subsequent scheduling indicator and attempt to receive the subsequent data transmission, thereby reducing data transmission latency.

Resources for narrowband communication in a licensed or an unlicensed radio frequency spectrum band may be configured and allocated based on resource availability, regulatory constraints, device capability or category, etc. eMTC devices or other relatively low complexity devices, including those associated with the IoT, may communicate using one or more narrowbands, which may occupy six resource blocks (RBs). In some cases, different countries may have different amounts of available bandwidth configurations that the devices may use.

By way of example, eMTC and IoT devices may transmit a relatively low amount of data periodically (or when requested) rather than continuously exchanging information with a base station (or other serving station). Such devices may include meters (e.g., water meter, gas meter), sensors (e.g., smoke detector, light sensor), or wearable technology (e.g., smart watches), which may have limited battery life or may be located at the edges of cell coverage areas. Instead of operating using a traditional deployment configuration designed for high data rates or continuous communication (e.g., LTE/LTE-Advanced (LTE-A)), these devices may communicate using deployment configurations designed to reduce the complexity of devices, increase coverage, and provide better battery life.

Depending on a geographic region of operation, the resource flexibility of an eMTC deployment may allow a device to satisfy, for example, certain bandwidth requirements (e.g., for a given application). While eMTC may offer some advantages, bandwidth selection may be limited in a traditional eMTC deployments. Accordingly, it may be possible to provide improved system performance to support narrowband techniques that facilitate flexible deployment operation (e.g., bandwidth selection in eMTC deployments).

Aspects of the disclosure are initially described in the context of a wireless communication system. The wireless communication system may be a heterogeneous wireless communication system supporting traditional cellular communications (e.g., LTE/LTE-A) and also supporting narrowband communications (e.g., eMTC configured devices).

In some aspects, a UE may determine that a data transmission is scheduled for the UE based on a scheduling indicator received on a first instance of a control channel. The UE may identify a first frequency band for the data transmission, e.g., one or more narrowbands where each narrowband includes a plurality of RBs. The UE may identify a second frequency band associated with a second instance of a control channel. The UE may identify a third frequency for monitoring based on the first and second frequency bands and a bandwidth capability of the UE. The third frequency may include the first frequency band and have an associated bandwidth that is based on the bandwidth capability of the UE. The UE may receive the data transmission in the first frequency band and a portion of the second instance of the control channel in the second frequency band that overlaps with the third frequency band.

Additionally or alternatively, aspects of described techniques provide for a base station to select a bandwidth for a data transmission with the UE based on the bandwidth capability of the UE, certain traffic parameters, and the like. For example, the base station may identify the bandwidth capability of the UE and determine traffic parameters (e.g., pathloss, channel quality, available transmit power of the UE, etc.) for cellular communications over the wireless medium and for eMTC over the wireless medium. The base station may select a bandwidth for the data transmission with the UE based on the bandwidth capability of the UE and the identified traffic parameters.

Aspects of the disclosure are further illustrated by and described with reference to apparatus diagrams, system diagrams, and flowcharts that relate to bandwidth selection for eMTC communications.

FIG. 1 illustrates an example of a wireless communication system 100 in accordance with various aspects of the present disclosure. The wireless communication system 100 includes base stations 105, UEs 115, and a core network 130. In some examples, the wireless communication system 100 may be a LTE (or LTE-A) network, or a NR network. In some cases, wireless communication system 100 may support enhanced broadband communications, ultra-reliable (i.e., mission critical) communications, low latency communications, and communications with low-cost and low-complexity devices. In some aspects, wireless communication system 100 may support communication between base stations 105 and UE 115 with different capabilities, e.g., LTE/LTE-A capabilities and eMTC capabilities).

Base stations 105 may wirelessly communicate with UEs 115 via one or more base station antennas. Each base station 105 may provide communication coverage for a respective geographic coverage area 110. Communication links 125 shown in wireless communication system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communication system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an IoT device, an Internet of Everything (IoE) device, a MTC device, an eMTC device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as eMTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communication system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one serving gateway (S-GW), and at least one packet gateway (P-GW). The MME may be the control node that processes the signaling between the UE 115 and the EPC. All user Internet Protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices, such as base station 105 may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate in an ultra high frequency (UHF) frequency region using frequency bands from 700 MHz to 2600 MHz (2.6 gigahertz (GHz)), although in some cases wireless communication system 100 may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communication system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions.

Thus, wireless communication system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference.

In some cases, the antennas of a base station 105 or UE 115 may be located within one or more antenna arrays, which may support beamforming or multiple-input/multiple-output (MIMO) operations. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

Time intervals in LTE or NR may be expressed in multiples of a basic time unit. Time resources may be organized according to radio frames of length of 10 milliseconds (ms), for example, which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier. A RB may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE 115 receives and the higher the modulation scheme, the higher the data rate may be.

In some cases, wireless communication system 100 may utilize both licensed and unlicensed radio frequency spectrum bands. For example, wireless communication system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on frequency division duplexing (FDD), time division duplexing (TDD) or a combination of both.

Wireless communication system 100 may support aspects of described techniques for bandwidth selection for eMTC. For example, a UE 115 may receive a scheduling indicator on a first instance of a control channel. The UE 115 may determine that a data transmission is scheduled for the UE 115 based at least in part on the received scheduling indicator. The UE 115 may identify a first frequency band associated with the data transmission and a second frequency band associated with a second instance of the control channel. The UE 115 may identify a third frequency band to monitor based at least in part on the first and second frequency bands and a bandwidth capability of the UE 115. The third frequency band may include the first frequency band and have a bandwidth that is based at least in part on the bandwidth capability of the UE 115. The UE 115 may receive the data transmission in the first frequency band and a portion of the second instance of the control channel in the second frequency band that overlaps with the third frequency band.

Additionally or alternatively, a base station 105 may identify a bandwidth capability of a UE 115. The base station 105 may determine a first traffic parameter for cellular communications over a wireless medium and a second traffic parameter for MTC over the wireless medium. The base station 105 may select a bandwidth for a data transmission associated with the UE 115. The selected bandwidth may be based on the identified bandwidth capability of the UE 115 and the first and second traffic load parameters.

Figure 2:
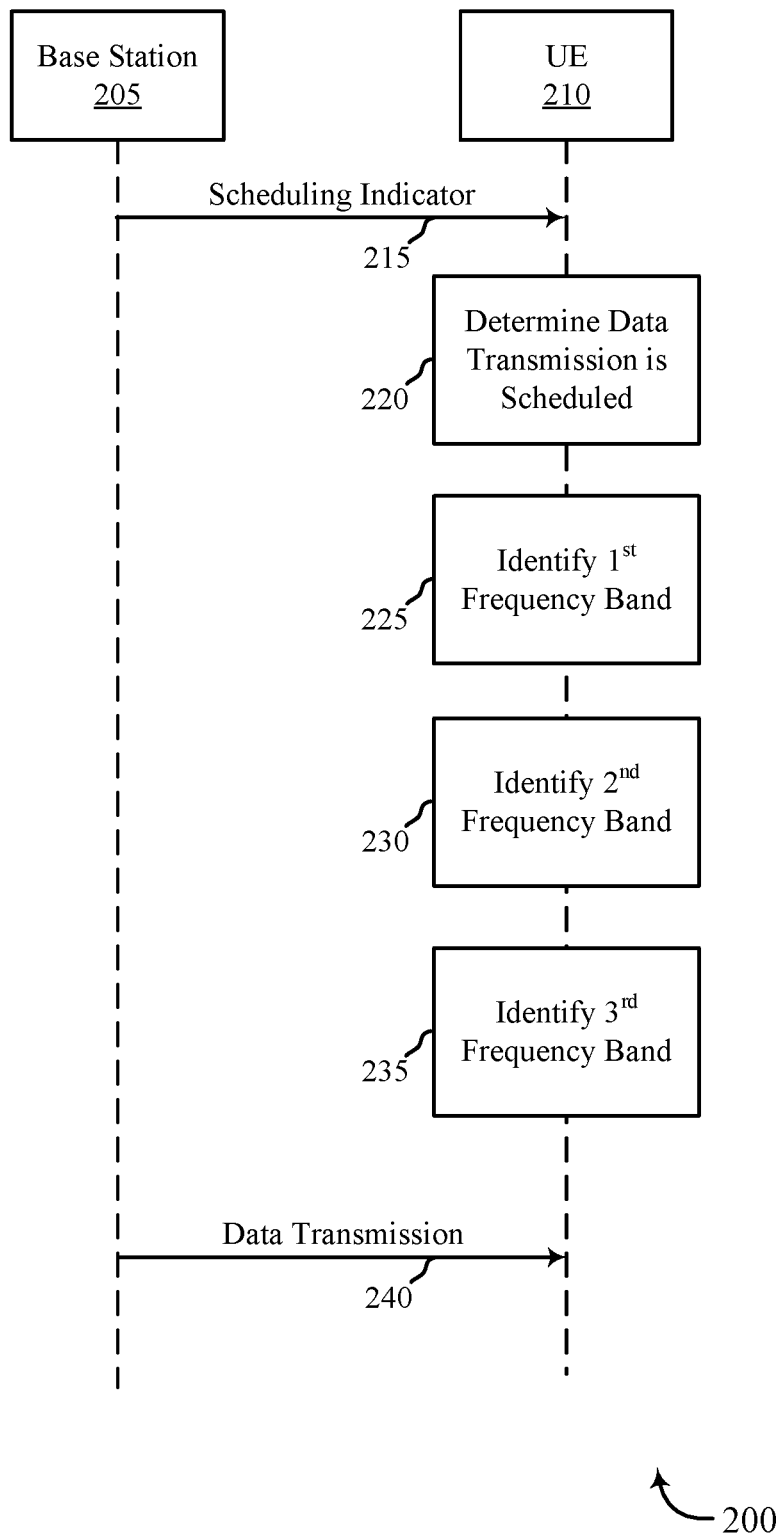
FIG. 2 illustrates an example of a process that supports bandwidth selection for eMTC communications in accordance with aspects of the present disclosure.

FIG. 2 illustrates an example of a process 200 for bandwidth selection for eMTC communications. Process 200 may implement aspect(s) of wireless communication system 100 of FIG. 1. Process 200 may include a base station 205 and a UE 210. Base station 205 and UE 210 may be examples of the corresponding devices described herein. The UE 210 may be an example of a wireless device.

Generally, process 200 illustrates an example of a UE 210 selecting a bandwidth to monitor based on the bandwidth capability of the UE 210 and/or frequency bands associated with a data transmission and with an instance of a control channel. In some aspects, an eMTC configured wireless communication system may include 2, 4, 8, 16, 32, 48, 64, or some other number of available narrowbands. Each narrowband may include a predetermined number of RBs (e.g., 6 RBs per narrowband) and have an associated bandwidth (e.g., 1.4. MHz). Each narrowband may be identified according to an index, e.g., NB0, NB1, NB3, and so forth. Moreover, certain narrowbands may be divided into predefined or preconfigured groups of narrowbands, e.g., a first group consisting of NB0-NB3, a second group consisting of NB4-NB7. Other group sizes may include 2 narrowbands per group, 6 narrowbands per group, etc.

Generally, eMTC configurations may include transmission of control information in a control channel. The control channel may be transmitted in some, but not necessarily all, available narrowbands in the system. For instance, the control information may be transmitted in a control channel using a particular narrowband, e.g., NB0, during each subframe. In some examples, the control channel may hop across different narrowbands across subframes, e.g., in NB0 in a first subframe, in NB3 in a second subframe, etc.

Moreover, each UE (such as UE 210) within an eMTC configured wireless communication system may have a different bandwidth capability. For example, every UE may be configured to communicate in at least one narrowband (e.g., have a bandwidth capability of 1.4 MHz), while certain UEs may be configured to communicate in multiple NBs (e.g., wideband UEs having bandwidth capabilities of 5 MHz, 20 MHz, etc.). Additionally, resource allocations for certain types of communications may be preconfigured in eMTC wireless communication systems. For example, transmission of the control information in the control channel may be limited to one narrowband, whereas data being transmitted in a data transmission may span multiple narrowbands for eMTC UEs that are configured for wideband communications. Examples of available widebands may include, but are not limited to, 1.4 MHz, 5 MHz, 20 MHz, and the like.

In a traditional eMTC configured wireless communication system, these configurations may result in increased latency when the UE cannot monitor for control information. For example, a UE may receive a scheduling indication of a data transmission in a first subframe and then open up a bandwidth to receive the data transmission in the next subframe, per the scheduling indication. However, traditional eMTC configurations may not support the UE monitoring the control channel in the second subframe and, therefore, the UE may miss a scheduling indicator in the second subframe that schedules a second data transmission in the third subframe. Aspects of the described techniques, however, may provide a mechanism where the UE can select a bandwidth to monitor the control channel during the second subframe and avoid the delay in receiving the second data transmission.

In one aspect, the UE may monitor the control channel if the allocated narrowbands for a data transmission include the narrowband for the control channel. For example, if parts of NB1 and NB2 are allocated for the data transmission during the second subframe and if the control channel for the second subframe is allocated to either of NB1 or NB2, the UE may monitor the control channel during the second subframe in the allocated narrowband.

In another aspect, the UE may monitor the control channel if the allocated narrowbands for the data transmission, the narrowband for the control channel, and the bandwidth capability of the UE support such monitoring. For example, if NB1 and NB2 are allocated for the data transmission during the second subframe, and if the control channel for the second subframe is either of NB0 or NB3, and the bandwidth capability of the UE spans three or more narrowbands, the UE may open up additional bandwidths to monitor the control channel during the second subframe while receiving the data transmission.

In another aspect, the UE may monitor the control channel if the allocated narrowbands for the data transmission and the control channel are within a predefined group of narrowbands. For example, if NB1 and NB2 are allocated for the data transmission during the second subframe, if NB1 and NB2 are within a predefined group that includes the narrowband allocated for the control channel during the second subframe, then the UE may open up additional bandwidths to monitor the control channel during the second subframe.

Thus, process 200 and the described techniques provide for the UE to monitor the control channel during a second subframe (or instance) of the control channel during a data transmission.

At 215, UE 210 may receive a scheduling indicator on a first instance of a control channel. The first instance of the control channel may include the control information being transmitted in the control channel and during the first subframe. The control channel may be a MPDCCH control channel and may be received in one narrowband.

At 220, UE 210 may determine that a data transmission is scheduled for UE 210 based on the scheduling indicator. For example, the scheduling indicator may provide an indication or pointer to one or more narrowbands (or resources with the narrowbands) in the next (or second) subframe that will carry data intended for UE 210. The scheduling indicator may convey an indication of the starting location, length, etc., for the data being conveyed in the data transmission.

At 225, UE 210 may identify a first frequency band associated with the data transmission. For example, the first frequency band may include multiple narrowbands being used in the second subframe to convey the data. The first frequency band may be based on the number of narrowbands allocated for the data transmission. For example, each allocated narrowband may have an associated bandwidth of 1.4 MHz. For example purposes only, the first frequency band may have an associated bandwidth of 2.8 MHz based on NB1 and NB2 being allocated for the data transmission.

At 230, UE 210 may identify a second frequency band. The second frequency band may be associated with a second instance of the control channel. The second instance of the control channel may refer to the control channel being transmitted in the same subframe that the data transmission is scheduled for. The second instance of the control channel may be associated with the same or with a different narrowband than the first instance of the control channel. For example purposes only, the second frequency band may have an associated bandwidth of 1.4 MHz based on one narrowband being allocated for the control channel.

In some examples, the second frequency band may be a smallest frequency region that includes a set of resource blocks allocated to a particular control channel transmission. In some examples, the second frequency band may be a smallest frequency region that includes some (or all) of the resource blocks that are part of the control channel search space (e.g., the common search space, the UE-specific search space, or both). In some examples, the second frequency band may be a control channel narrowband. In some examples, the first frequency band may be a smallest frequency region that includes some (or all) of the resource blocks assigned to the data transmission. In some examples, the first frequency band is the smallest frequency region that includes all the narrowbands that have any resource blocks assigned to the data transmission.

At 235, UE 210 may identify a third frequency band to monitor. The third frequency band may be determined based on the first frequency band and the second frequency band. In some aspects, the third frequency band may be determined based on the bandwidth capability of UE 210 (e.g., 1.4 MHz bandwidth capability, 5 MHz bandwidth capability, 20 MHz bandwidth capability, etc.). Generally, the third frequency band comprises a bandwidth wide enough for UE 210 to receive the data being transmitted during the second subframe and allow the UE 210 to also monitor the control channel during the second subframe, when possible.

In some aspects, the third frequency band may be wide enough to cover the first frequency band (e.g., the narrowbands allocated for the data transmission) when the second frequency band is within the first frequency band (e.g., NB1 and NB2 are allocated for the data transmission and either NB1 or NB2 is allocated for the control channel). Thus, UE 210 can monitor the control channel within the bandwidth opened up for the data transmission.

The third frequency band may be based on the bandwidth capability of UE 210 and may include the first frequency band. That is and continuing with the example above, the third frequency band may have an associated bandwidth that covers NB1 and NB2. Moreover, the third frequency band may also overlap with the second frequency band. For example where the narrowband allocated for the control channel includes NB3 (or NB0 or NB4) and the bandwidth capability of UE 210 is 5 MHz (e.g., spans four narrowbands), the third frequency band may be 5 MHz. If the bandwidth capability of UE 210 was 20 MHz and NB1/NB2 were allocated for the data transmission and NB5 was allocated for the control channel, the third frequency band may have a bandwidth that spans 5 narrowbands (e.g., 7 MHz or the full 20 MHz).

At 240, UE 210 may receive the data transmission in the first frequency band and a portion of the second instance of the control channel in the second frequency band that overlaps with the third frequency band.

In some aspects, the data transmission and/or control channels may hop across subframes according to a predefined hopping pattern. As can be appreciated, the third frequency band may be identified for each subframe (e.g., based on how many and which narrowbands have been allocated to the data transmission and control channel for that subframe).

In the hopping scenario, UE 210 may respond in several ways. As one example, UE 210 may monitor the control channel on subframes where possible (e.g., where the third frequency band covers at least a portion of the first and/or second frequency bands) and, for subframes where the control channel cannot be monitored (e.g., one or more subframes where the second and third frequency bands do not overlap), UE 210 may assume that those subframes are punctured. As another option, UE 210 may stop monitoring the control channel in the search space completely, e.g., to minimize computational requirements, conserve power, etc.

In an example, UE 210 may monitor the control channel (e.g., MPDCCH) on subframes where possible and assume the remaining subframes are punctured. In some cases, UE 210 is expected to monitor the control channel based at least in part on observations of portions of the control channel on a subset of subframes where the third frequency band includes at least some portions of the second frequency band. In other cases, the UE 210 is expected to monitor the control channel when the third frequency band includes the second frequency band in some (or all) subframes that contain the control channel and/or the control channel search space (e.g., the common search space, the UE-specific search space, or both). In some cases, UE 210 may cease or otherwise stop monitoring the MPDCCH in up to the entire search space if the second and third frequency bands do not overlap in as few as a single subframe.

As another example where the control and/or data channels are hopping, UE 210 may continue to monitor the control channel in the appropriate narrowbands per subframe while there is no data transmission scheduled for UE 210. If there is a data transmission scheduled with hopping, UE 210 may follow the data channel (e.g., PDSCH) hopping pattern. In subframes with data, UE 210 may monitor additional control channels (e.g., in adjacent RBs within the UE's capability). In this mode, the control channel hopping may follow the hopping pattern for the data channel. Otherwise, UE 210 may monitor the overlapping regions of the control and the data channels within the bandwidth capability of UE 210.

Figure 3:
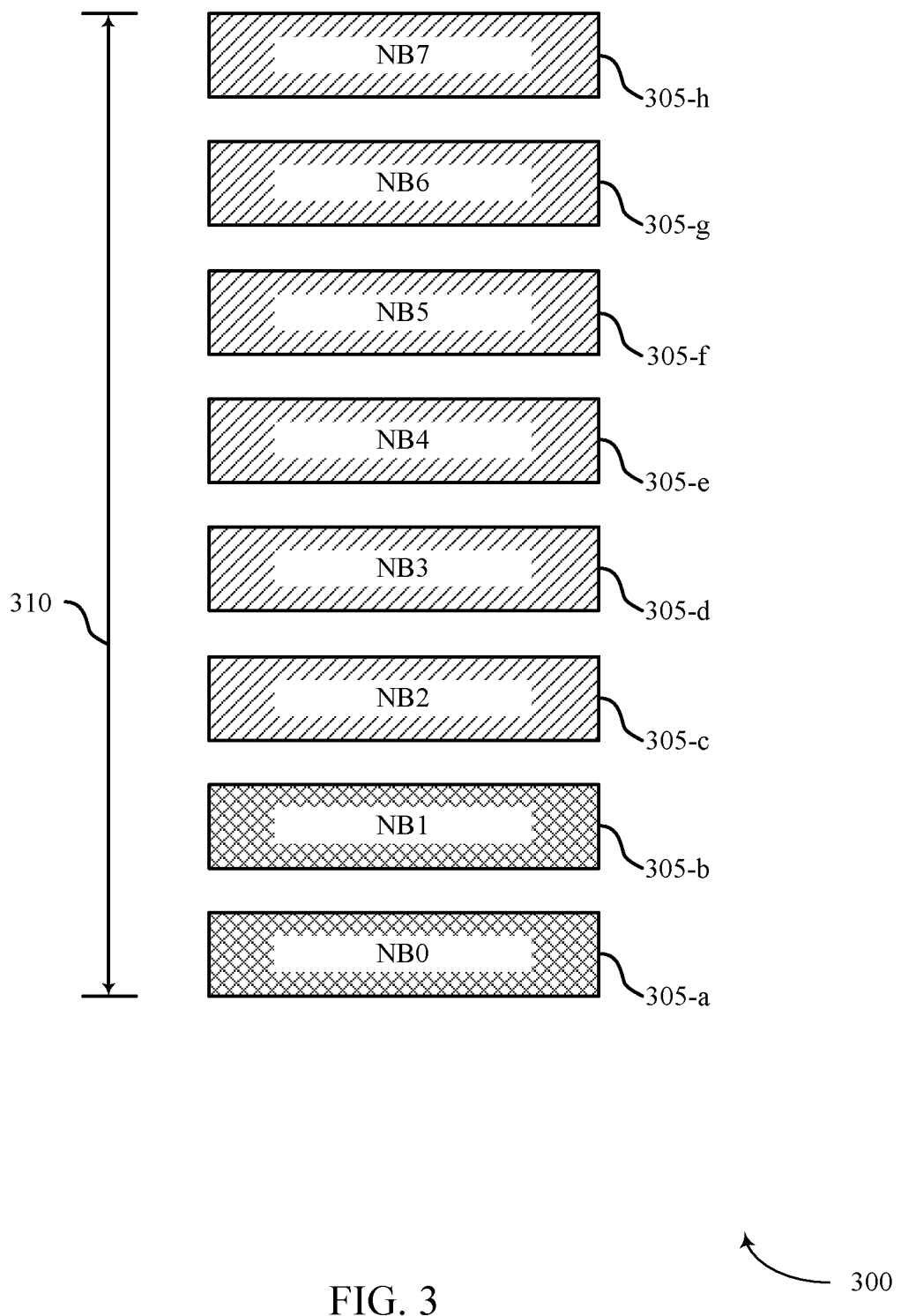
FIG. 3 illustrates an example of a channel configuration that supports bandwidth selection for eMTC communications in accordance with aspects of the present disclosure.

FIG. 3 illustrates an example of a channel configuration 300 for bandwidth selection for eMTC communications. Channel configuration 300 may implement aspect(s) of wireless communication system 100 and/or process 200 of FIGS. 1 and 2. Channel configuration 300 may be implemented by a UE 115 and/or a base station 105 for wireless communications in a eMTC system. The UE 115 and base station 105 may be examples of the corresponding devices described herein.

Generally, channel configuration 300 may include a plurality of NBs 305, with eight NBs 305 being shown by way of example. Each NB may have an associated index number. Thus, channel configuration 300 may include NB0 305-*a*, NB1 305-*b*, NB2 305-*b*, and so forth. Each NB 305 may have an associated bandwidth and may include, in some examples, 6 RBs. As discussed above, each RB may have 12 sub-carriers in the frequency domain that span multiple symbol periods in the time domain.

Moreover, channel configuration 300 also indicates a relationship between the NBs 305 and a bandwidth capability 310 of a UE. The bandwidth capability 310 may be determined based on the configuration of the UE, on the number of communication chains of the UE, and the like.

As is discussed, a data transmission may have an associated first frequency band. The size of the first frequency band may be determined based on the number of NBs 305 allocated to the data transmission. Data being transmitted in a NB 305 may occupy a plurality of RBs of the NB 305, but may not occupy every resource or RB of the NB 305. Thus, a particular NB 305 may carry data for a data transmission as well as other information, e.g., control information, within the subframe.

Control information may not be allocated for every NB 305 during a subframe. Instead, the control channel may be allocated to one NB 305 per subframe, may be hopped across different NBs 305 for different subframes, and the like. The control channel transmission therefore may have an associated second bandwidth that corresponds to a particular NB 305 (e.g., the full bandwidth of the NB 305, a bandwidth of the sub-carrier(s) within a RB carrying the control channel, etc.)

As also discussed, the UE may identify a third frequency band to monitor based on the bandwidth capability 310 of the UE. The bandwidth capability 310 used to identify the third frequency band may support the UE monitoring the control channel in a subframe concurrently with receiving data in a data transmission in the subframe.

As also discussed, the third frequency band may be based on predefined frequency band configurations that include a set of NBs 305. Examples of the predefined frequency band configuration may include one set comprising NBs 305-*a* through 305-*d* and a second set comprising NBs 305-*e* through 305-*h*. Other examples may include two, six, eight, or some other number of NBs 305 per set. The third frequency band may be overlapping (e.g., NBs 305-*a* and 305-*c* allocated for data may overlap with NB 305-*b* allocated to the control channel) or non-overlapping (e.g., NBs 305-*a* and 305-*b* may not overlap with NB 305-*c* allocated to the control channel).

Figure 4:
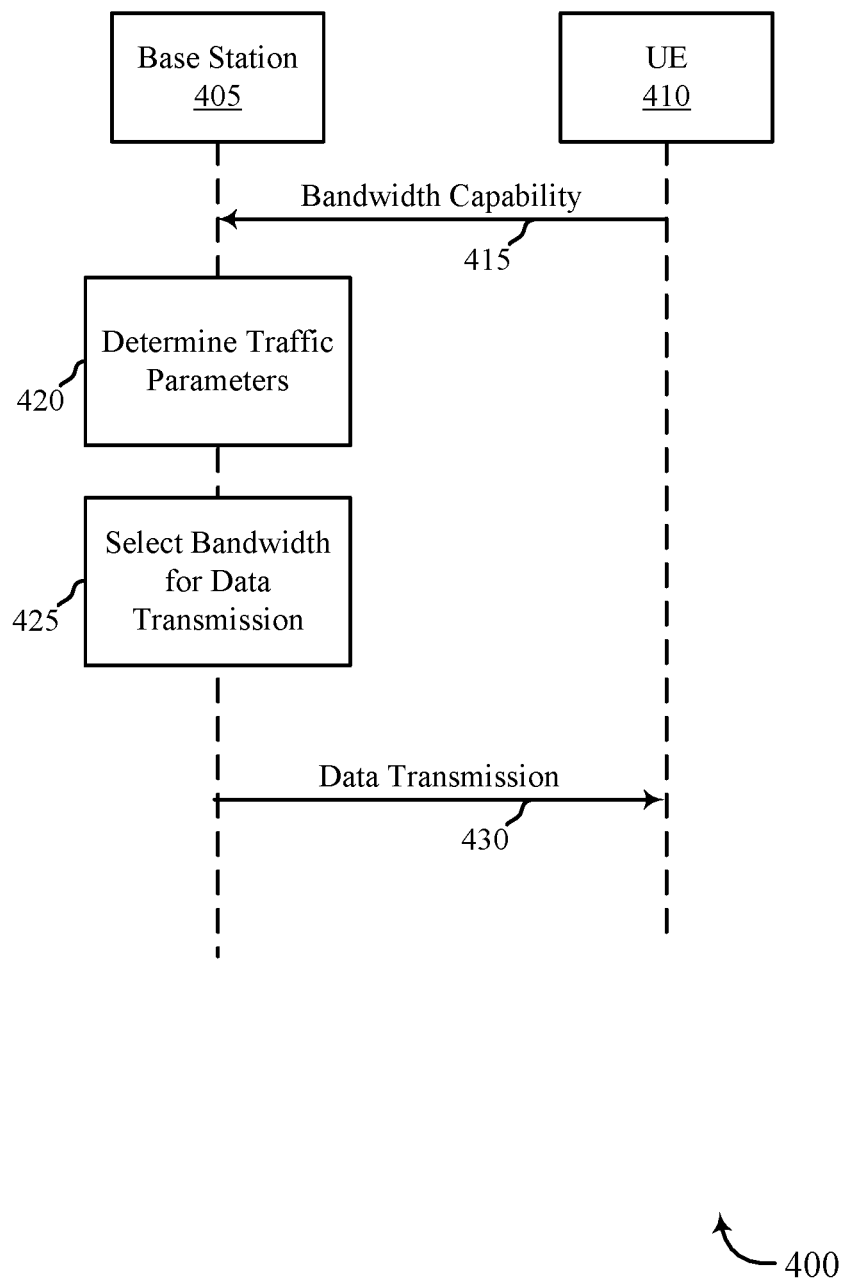
FIG. 4 illustrates an example of a process that supports bandwidth selection for eMTC communications in accordance with aspects of the present disclosure.

FIG. 4 illustrates an example of a process 400 for bandwidth selection for eMTC communications. Process 400 may implement aspect(s) of wireless communication system 100, process 200, and/or carrier configuration 300 of FIGS. 1 through 3. Process 400 may include a base station 405 and a UE 410. Base station 405 and UE 410 may be examples of the corresponding devices described herein. The UE 410 may be an example of a wireless device.

Generally, process 400 illustrates an example of base station 405 determining a UE 410 bandwidth mode. For example, the bandwidth mode for UE 410 may be radio resource control (RRC) configured by base station 405. Traditionally, these larger bandwidth modes for UE 410 may have some constraints on resource allocation flexibility and may use larger DCI sizes, which may impact performance. Process 400 illustrates one example of base station 405 selecting a bandwidth mode for UE 410 depending on the UE 410 transmit power, path loss, etc.

At 415, base station 405 may identify a bandwidth capability of UE 410. Base station 405 may determine the bandwidth capability of UE 410 based on a signal received from UE 410, e.g., during messages exchanged between base station 405 and UE 410 during initial attachment, based on capability configuration messages broadcast from UE 410, etc.

At 420, base station 405 may determine traffic parameters. For example, base station 405 may determine a first traffic parameter associated with cellular communications over a medium (e.g., LTE, LTE-A, Wi-Fi, and the like). Base station 405 may determine a second traffic parameter associated with MTC over the wireless medium (e.g., eMTC, IoT, etc.). The traffic parameters may include a pathloss value between base station 405 and UE 410 over the wireless medium, a channel quality indicator for the wireless medium, an available transmit power for UE 410, and the like. The traffic parameters may be determined based on previous channel feedback messages, previous communications between base station 405 and UE 410, based on feedback from other UEs that are located proximate to UE 410, and the like.

At 425, base station 405 may select a bandwidth for a data transmission with UE 410. In some aspects, selecting the bandwidth may include selecting the widest bandwidth that UE 410 supports, e.g., per the bandwidth capability of UE 410.

In some aspects, base station 405 may select the bandwidth based on the bandwidth capability of UE 410 and the identified traffic parameters. In some aspects where the traffic parameters are at threshold values, e.g., pathloss above predetermined value, available below a predetermined value, high channel noise, etc., the selected bandwidth may be a narrowband bandwidth. Conversely, when the traffic parameters are above or below (as the case may be) the threshold values, the selected bandwidth may be a wideband bandwidth (provided the bandwidth capability of UE 410 supports wideband communications.

In some aspects where the data transmission with UE 410 is an uplink transmission, selecting the bandwidth for the data transmission may be based on the traffic parameters, e.g., if UE 410 is communicating in less than 6 RBs due to power constraint, a narrowband bandwidth may be selected.

At 430, base station 405 may transmit the data to UE 410 in the data transmission. The data may be transmitted at the selected bandwidth (e.g., comprising NB(s) allocated according to the selected bandwidth).

Figure 5:
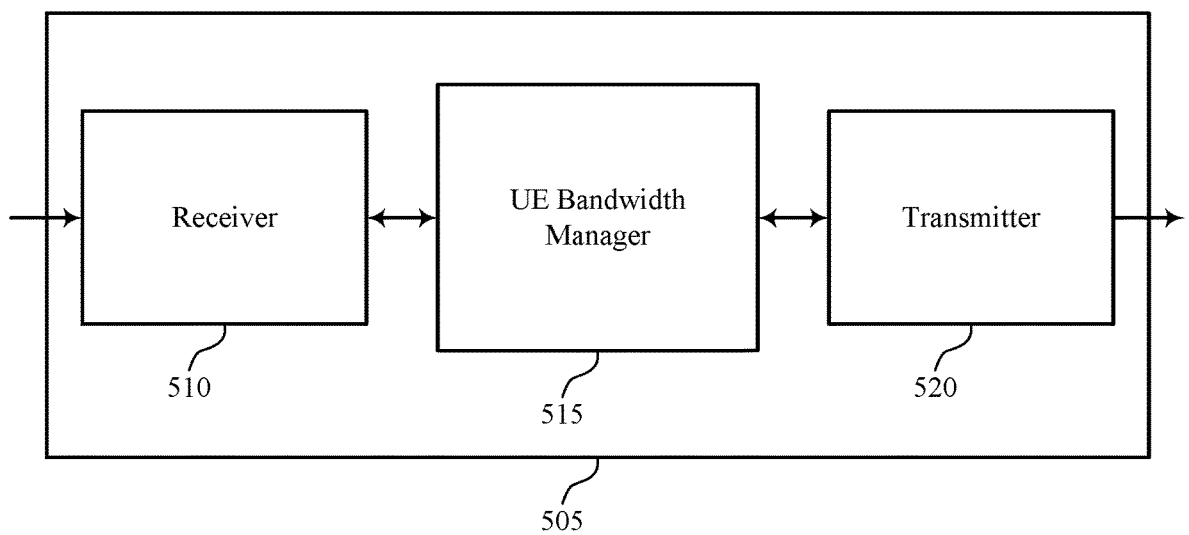
FIGS. 5 through 7 show block diagrams of a device that supports bandwidth selection for eMTC communications in accordance with aspects of the present disclosure.

FIG. 5 shows a block diagram 500 of a wireless device 505 that supports bandwidth selection for eMTC communications in accordance with various aspects of the present disclosure. Wireless device 505 may be an example of aspects of a UE 115 as described with reference to FIGS. 1 through 4. Wireless device 505 may include a receiver 510, a UE bandwidth manager 515, and a transmitter 520. Wireless device 505 may also include a processor. Each of these components may be in communication with one another (e.g., via one or more buses).

Receiver 510 may receive information such as packets, user data, or control information associated with various information channels (e.g., control channels, data channels, and information related to bandwidth selection for eMTC communications, etc.). Information may be passed on to other components of the device. The receiver 510 may be an example of aspects of the transceiver 835 described with reference to FIG. 8.

UE bandwidth manager 515 may be an example of aspects of the UE bandwidth manager 815 described with reference to FIG. 8.

UE bandwidth manager 515 and/or at least some of its various sub-components may be implemented in hardware, software executed by a processor, firmware, or any combination thereof. If implemented in software executed by a processor, the functions of the UE bandwidth manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE bandwidth manager 515 and/or at least some of its various sub-components may be physically located at various positions, including being distributed such that portions of functions are implemented at different physical locations by one or more physical devices. In some examples, UE bandwidth manager 515 and/or at least some of its various sub-components may be a separate and distinct component in accordance with various aspects of the present disclosure. In other examples, UE bandwidth manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE bandwidth manager 515 may receive, at a wireless device (e.g., wireless device 505), a scheduling indicator on a first instance of a control channel. UE bandwidth manager 515 may determine that a data transmission is scheduled for the wireless device based on the received scheduling indicator. UE bandwidth manager 515 may identify a first frequency band associated with the data transmission. UE bandwidth manager 515 may identify a second frequency band associated with a second instance of the control channel. UE bandwidth manager 515 may identify a third frequency band to monitor based on the first and second frequency bands and a bandwidth capability of the wireless device, where the third frequency band includes the first frequency band, and where the third frequency band includes an associated bandwidth that is based on the bandwidth capability of the wireless device. UE bandwidth manager 515 may receive the data transmission in the first frequency band and a portion of the second instance of the control channel in the second frequency band that overlaps with the third frequency band.

Transmitter 520 may transmit signals generated by other components of the device. In some examples, the transmitter 520 may be collocated with a receiver 510 in a transceiver module. For example, the transmitter 520 may be an example of aspects of the transceiver 835 described with reference to FIG. 8. The transmitter 520 may include a single antenna, or it may include a set of antennas.

Figure 6:
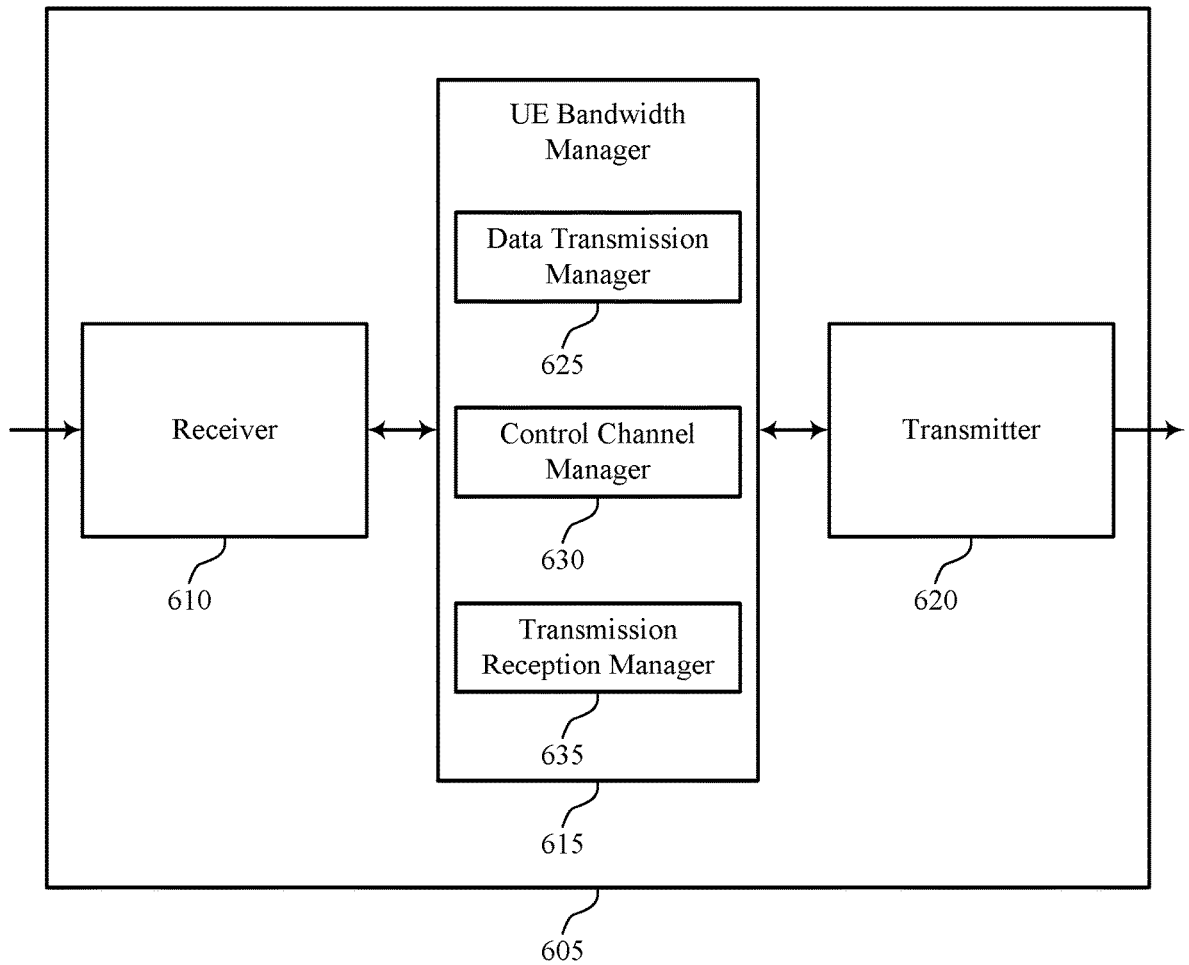

FIG. 6 shows a block diagram 600 of a wireless device 605 that supports bandwidth selection for eMTC communications in accordance with various aspects of the present disclosure. Wireless device 605 may be an example of aspects of a wireless device 505 or a UE 115 as described with reference to FIGS. 1 through 5. Wireless device 605 may include a receiver 610, a UE bandwidth manager 615, and a transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to bandwidth selection for eMTC communications, etc.). Information may be passed on to other components of the device. The receiver 610 may be an example of aspects of the transceiver 835 described with reference to FIG. 8.

UE bandwidth manager 615 may be an example of aspects of the UE bandwidth manager 815 described with reference to FIG. 8. UE bandwidth manager 615 may also include a data transmission manager 625, a control channel manager 630, and a transmission reception manager 635.

Data transmission manager 625 may receive, at a wireless device, a scheduling indicator on a first instance of a control channel. Data transmission manager 625 may determine that a data transmission is scheduled for the wireless device based on the received scheduling indicator. Data transmission manager 625 may identify a first frequency band associated with the data transmission. In some cases, the bandwidth capability associated with the data transmission includes one of a 5 MHz bandwidth or a 20 MHz bandwidth.

Control channel manager 630 may identify a second frequency band associated with a second instance of the control channel. Control channel manager 630 may identify a third frequency band to monitor based on the first and second frequency bands and a bandwidth capability of the wireless device, where the third frequency band includes the first frequency band, and where the third frequency band includes an associated bandwidth that is based on the bandwidth capability of the wireless device. In some cases, the third frequency band is identified to maximize the overlap with the second frequency band. In some cases, the third frequency band is the same as the first frequency band. In some cases, the frequency band for the control channel includes a 1.4 MHz bandwidth.

Transmission reception manager 635 may receive the data transmission in the first frequency band and a portion of the second instance of the control channel in the second frequency band that overlaps with the third frequency band.

Transmitter 620 may transmit signals generated by other components of the device. In some examples, the transmitter 620 may be collocated with a receiver 610 in a transceiver module. For example, the transmitter 620 may be an example of aspects of the transceiver 835 described with reference to FIG. 8. The transmitter 620 may include a single antenna, or it may include a set of antennas.

Figure 7:
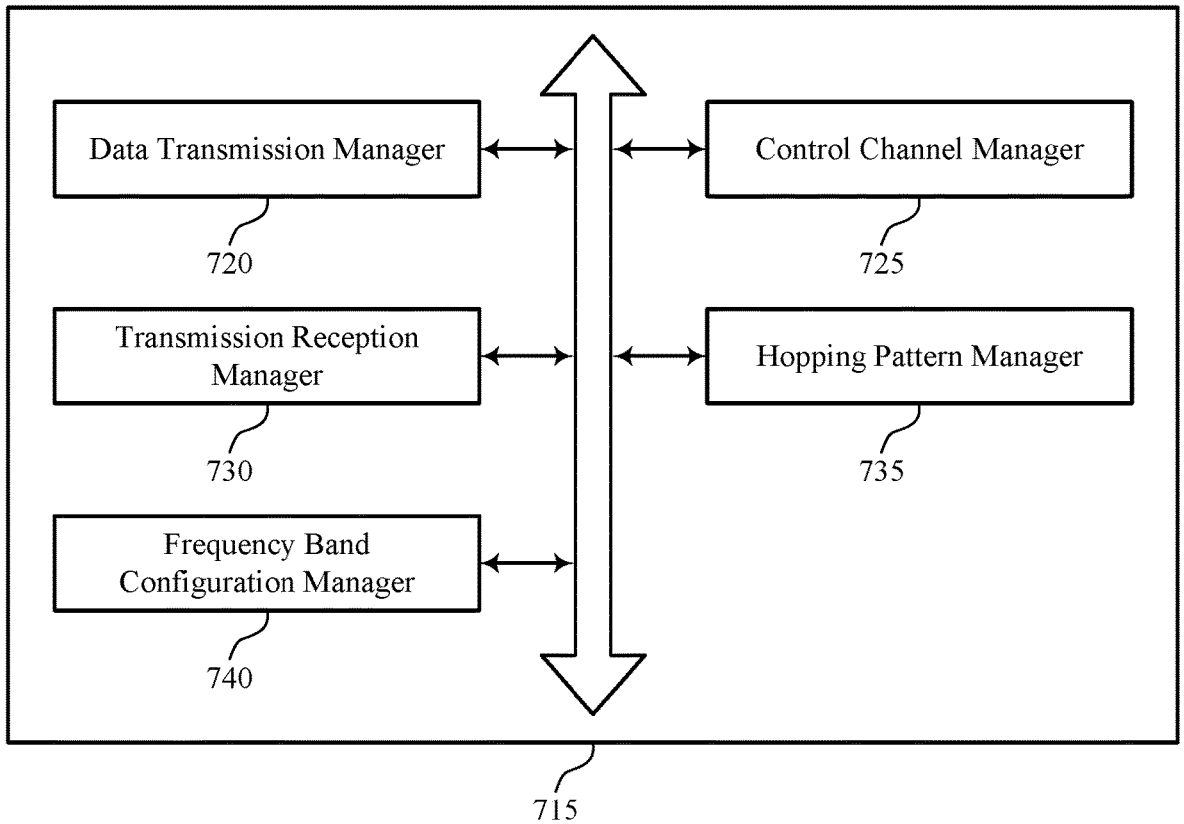

FIG. 7 shows a block diagram 700 of a UE bandwidth manager 715 that supports bandwidth selection for eMTC communications in accordance with various aspects of the present disclosure. The UE bandwidth manager 715 may be an example of aspects of a UE bandwidth manager 515, a UE bandwidth manager 615, or a UE bandwidth manager 815 described with reference to FIGS. 5, 6, and 8. The UE bandwidth manager 715 may include a data transmission manager 720, a control channel manager 725, a transmission reception manager 730, a hopping pattern manager 735, and a frequency band configuration manager 740. Each of these modules may communicate, directly or indirectly, with one another (e.g., via one or more buses).

Data transmission manager 720 may receive, at a wireless device, a scheduling indicator on a first instance of a control channel. Data transmission manager 720 may determine that a data transmission is scheduled for the wireless device based on the received scheduling indicator. Data transmission manager 720 may identify a first frequency band associated with the data transmission. In some cases, the bandwidth capability associated with the data transmission includes one of a 5 MHz bandwidth or a 20 MHz bandwidth.

Control channel manager 725 may identify a second frequency band associated with a second instance of the control channel. Control channel manager 725 may identify a third frequency band to monitor based on the first and second frequency bands and a bandwidth capability of the wireless device, where the third frequency band includes the first frequency band, and where the third frequency band includes an associated bandwidth that is based on the bandwidth capability of the wireless device. In some cases, the third frequency band is identified to maximize the overlap with the second frequency band. In some cases, the third frequency band is the same as the first frequency band. In some cases, the frequency band for the control channel includes a 1.4 MHz bandwidth.

Transmission reception manager 730 may receive the data transmission in the first frequency band and a portion of the second instance of the control channel in the second frequency band that overlaps with the third frequency band.

Hopping pattern manager 735 may manage aspects of the first and second frequency bands hopping across a set of subframes based on a predefined hopping pattern. Third frequency band may be identified in each subframe of the set of subframes. In some cases, the predefined hopping pattern includes the first frequency band hopping across a subframes different from the subframes that the second frequency band hops across.

Frequency band configuration manager 740 may identify a predefined frequency band configuration associated with the wireless device and identify the third frequency band such that it includes the first and second frequency bands when the first and second frequency bands are within the predefined frequency band configuration. In some cases, the predefined frequency band configuration is obtained by dividing a system bandwidth into non-overlapping subbands with bandwidth equal to the bandwidth capability of the wireless device.

Figure 8:
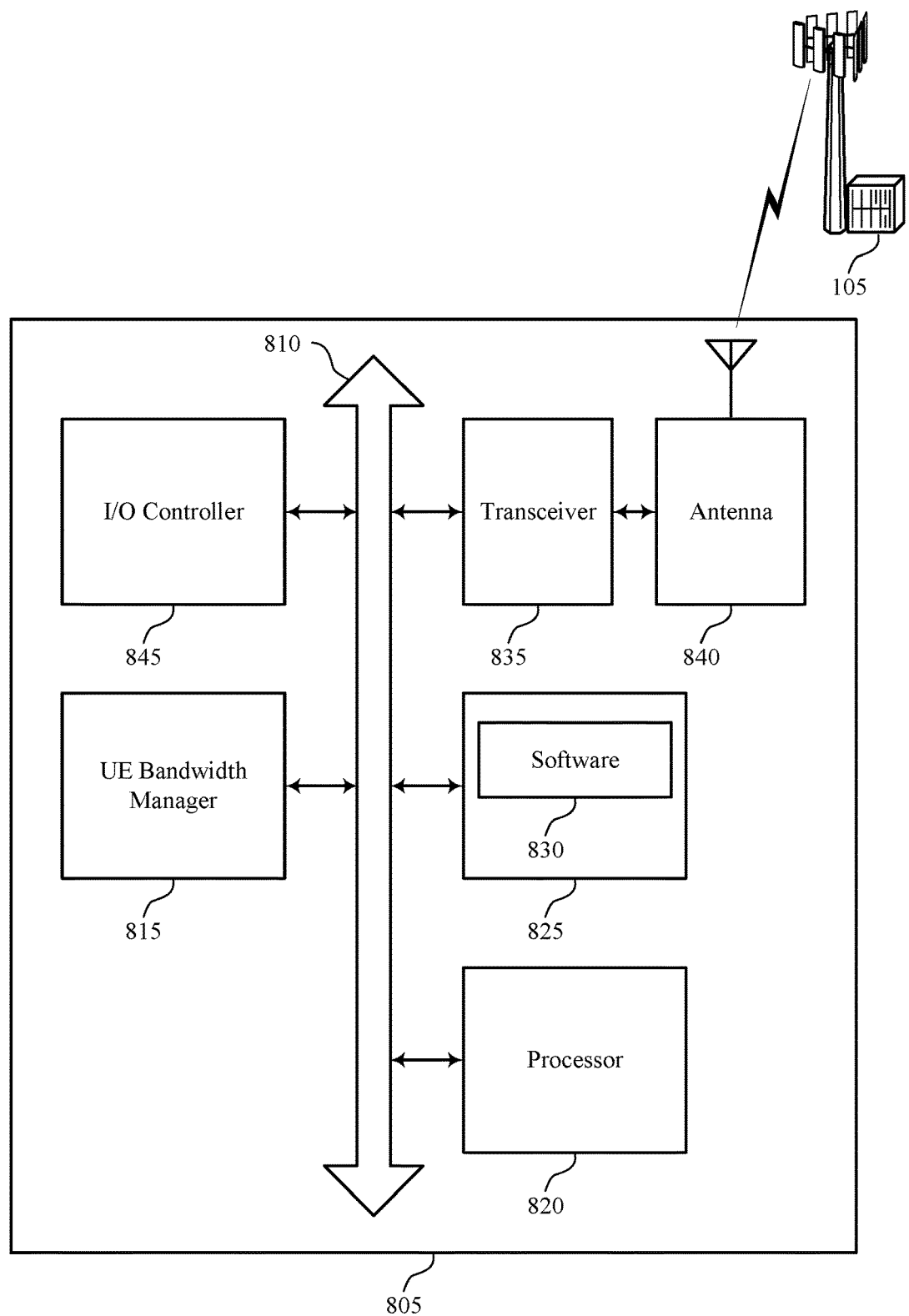
FIG. 8 illustrates a block diagram of a system including a UE that supports bandwidth selection for eMTC communications in accordance with aspects of the present disclosure.

FIG. 8 shows a diagram of a system 800 including a device 805 that supports bandwidth selection for eMTC communications in accordance with various aspects of the present disclosure. Device 805 may be an example of or include the components of wireless device 505, wireless device 605, or a UE 115 as described above, e.g., with reference to FIGS. 1 through 6. Device 805 may include components for bi-directional voice and data communications including components for transmitting and receiving communications, including a UE bandwidth manager 815, a processor 820, a memory 825, a software 830, a transceiver 835, an antenna 840, and an I/O controller 845. These components may be in electronic communication via one or more busses (e.g., bus 810). Device 805 may communicate wirelessly with one or more base stations 105.

Processor 820 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 820 may be configured to operate a memory array using a memory controller. In other cases, a memory controller may be integrated into processor 820. Processor 820 may be configured to execute computer-readable instructions stored in a memory to perform various functions (e.g., functions or tasks supporting bandwidth selection for eMTC communications).

Memory 825 may include random access memory (RAM) and read only memory (ROM). The memory 825 may store computer-readable, computer-executable software 830 including instructions that, when executed, cause the processor to perform various functions described herein. In some cases, the memory 825 may contain, among other things, a basic input/output system (BIOS) which may control basic hardware and/or software operation such as the interaction with peripheral components or devices.

Software 830 may include code to implement aspects of the present disclosure, including code to support bandwidth selection for eMTC communications. Software 830 may be stored in a non-transitory computer-readable medium such as system memory or other memory. In some cases, the software 830 may not be directly executable by the processor but may cause a computer (e.g., when compiled and executed) to perform functions described herein.

Transceiver 835 may communicate bi-directionally, via one or more antennas, wired, or wireless links as described above. For example, the transceiver 835 may represent a wireless transceiver and may communicate bi-directionally with another wireless transceiver. The transceiver 835 may also include a modem to modulate the packets and provide the modulated packets to the antennas for transmission, and to demodulate packets received from the antennas.

In some cases, the wireless device 805 may include a single antenna 840. However, in some cases the device may have more than one antenna 840, which may be capable of concurrently transmitting or receiving multiple wireless transmissions.

I/O controller 845 may manage input and output signals for device 805. I/O controller 845 may also manage peripherals not integrated into device 805. In some cases, I/O controller 845 may represent a physical connection or port to an external peripheral. In some cases, I/O controller 845 may utilize an operating system such as iOS®, ANDROID®, MS-DOS®, MS-WINDOWS®, OS/2®, UNIX®, LINUX®, or another known operating system. In other cases, I/O controller 845 may represent or interact with a modem, a keyboard, a mouse, a touchscreen, or a similar device. In some cases, I/O controller 845 may be implemented as part of a processor. In some cases, a user may interact with device 805 via I/O controller 845 or via hardware components controlled by I/O controller 845.

Figure 9:
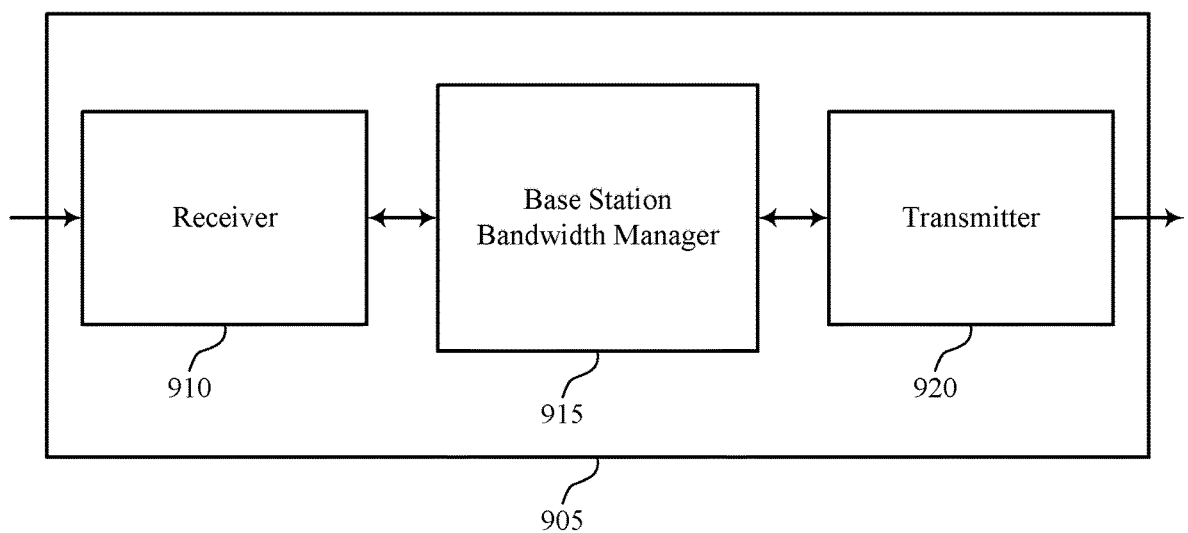
FIGS. 9 through 11 show block diagrams of a device that supports bandwidth selection for eMTC communications in accordance with aspects of the present disclosure.

FIG. 9 shows a block diagram 900 of a wireless device 905 that supports bandwidth selection for eMTC communications in accordance with various aspects of the present disclosure. Wireless device 905 may be an example of aspects of a base station 105 as described with reference to FIGS. 1 through 4. Wireless device 905 may include a receiver 910, a base station bandwidth manager 915, and a transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to bandwidth selection for eMTC communications, etc.). Information may be passed on to other components of the device. The receiver 910 may be an example of aspects of the transceiver 1235 described with reference to FIG. 12.

Base station bandwidth manager 915 may be an example of aspects of the base station bandwidth manager 1215 described with reference to FIG. 12.

Base station bandwidth manager 915 and/or at least some of its various sub-components may be implemented in hardware, software executed by a processor, firmware, or any combination thereof. If implemented in software executed by a processor, the functions of the base station bandwidth manager 915 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station bandwidth manager 915 and/or at least some of its various sub-components may be physically located at various positions, including being distributed such that portions of functions are implemented at different physical locations by one or more physical devices. In some examples, base station bandwidth manager 915 and/or at least some of its various sub-components may be a separate and distinct component in accordance with various aspects of the present disclosure. In other examples, base station bandwidth manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station bandwidth manager 915 may identify a bandwidth capability of a wireless device. Base station bandwidth manager 915 may determine a first traffic parameter for cellular communications over a wireless medium and a second traffic parameter for MTC over the wireless medium. Base station bandwidth manager 915 may select a bandwidth for a data transmission associated with the wireless device, the selection based on the identified bandwidth capability of the wireless device and the first traffic load parameter and the second traffic load parameter.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
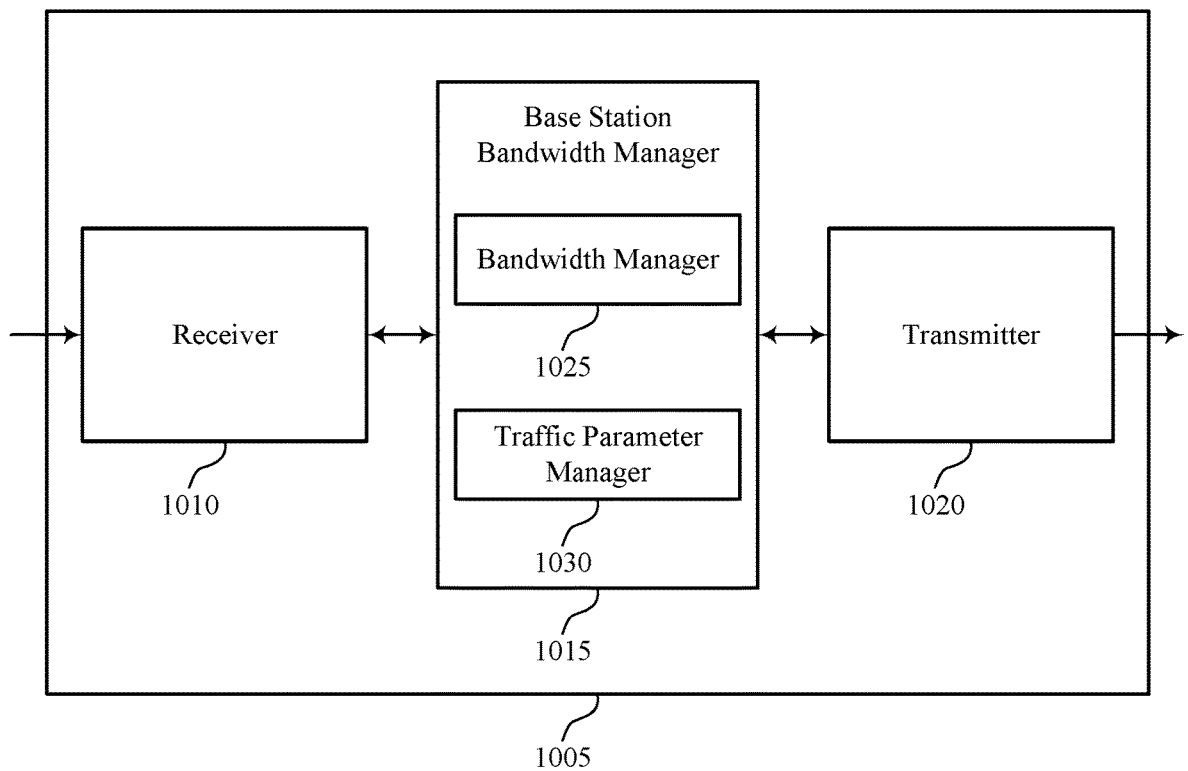

FIG. 10 shows a block diagram 1000 of a wireless device 1005 that supports bandwidth selection for eMTC communications in accordance with various aspects of the present disclosure. Wireless device 1005 may be an example of aspects of a wireless device 905 or a base station 105 as described with reference to FIGS. 1 through 4 and 9. Wireless device 1005 may include a receiver 1010, a base station bandwidth manager 1015, and a transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to bandwidth selection for eMTC communications, etc.). Information may be passed on to other components of the device. The receiver 1010 may be an example of aspects of the transceiver 1235 described with reference to FIG. 12.

Base station bandwidth manager 1015 may be an example of aspects of the base station bandwidth manager 1215 described with reference to FIG. 12. Base station bandwidth manager 1015 may also include a bandwidth manager 1025 and a traffic parameter manager 1030.

Bandwidth manager 1025 may identify a bandwidth capability of a wireless device. Bandwidth manager 1025 may select a bandwidth for a data transmission associated with the wireless device, the selection based on the identified bandwidth capability of the wireless device and the first traffic load parameter and the second traffic load parameter. Bandwidth manager 1025 may determine that one of an available transmit power or a pathloss value associated with the wireless device is below a threshold value, and select a narrowband bandwidth for the data transmission associated with the wireless device.

Traffic parameter manager 1030 may determine a first traffic parameter for cellular communications over a wireless medium and a second traffic parameter for MTC over the wireless medium.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
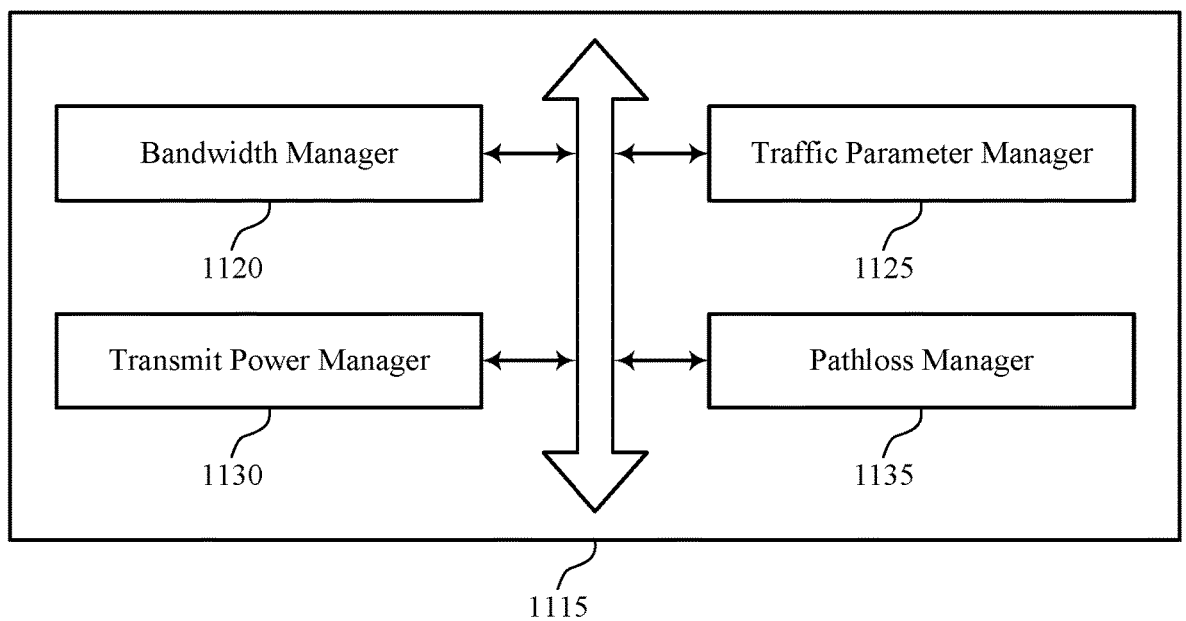

FIG. 11 shows a block diagram 1100 of a base station bandwidth manager 1115 that supports bandwidth selection for eMTC communications in accordance with various aspects of the present disclosure. The base station bandwidth manager 1115 may be an example of aspects of a base station bandwidth manager 1215 described with reference to FIGS. 9, 10, and 12. The base station bandwidth manager 1115 may include a bandwidth manager 1120, a traffic parameter manager 1125, a transmit power manager 1130, and a pathloss manager 1135. Each of these modules may communicate, directly or indirectly, with one another (e.g., via one or more buses).

Bandwidth manager 1120 may identify a bandwidth capability of a wireless device. Bandwidth manager 1120 may select a bandwidth for a data transmission associated with the wireless device, the selection based on the identified bandwidth capability of the wireless device and the first traffic load parameter and the second traffic load parameter. Bandwidth manager 1120 may determine that one of an available transmit power or a pathloss value associated with the wireless device is below a threshold value, and select a narrowband bandwidth for the data transmission associated with the wireless device.

Traffic parameter manager 1125 may determine a first traffic parameter for cellular communications over a wireless medium and a second traffic parameter for MTC over the wireless medium.

Transmit power manager 1130 may determine an available transmit power for the data transmission from the wireless device, where the selection of the bandwidth is based on the available transmit power.

Pathloss manager 1135 may determine a pathloss value associated with the wireless device, where the selection of the bandwidth is based on the pathloss value.

Figure 12:
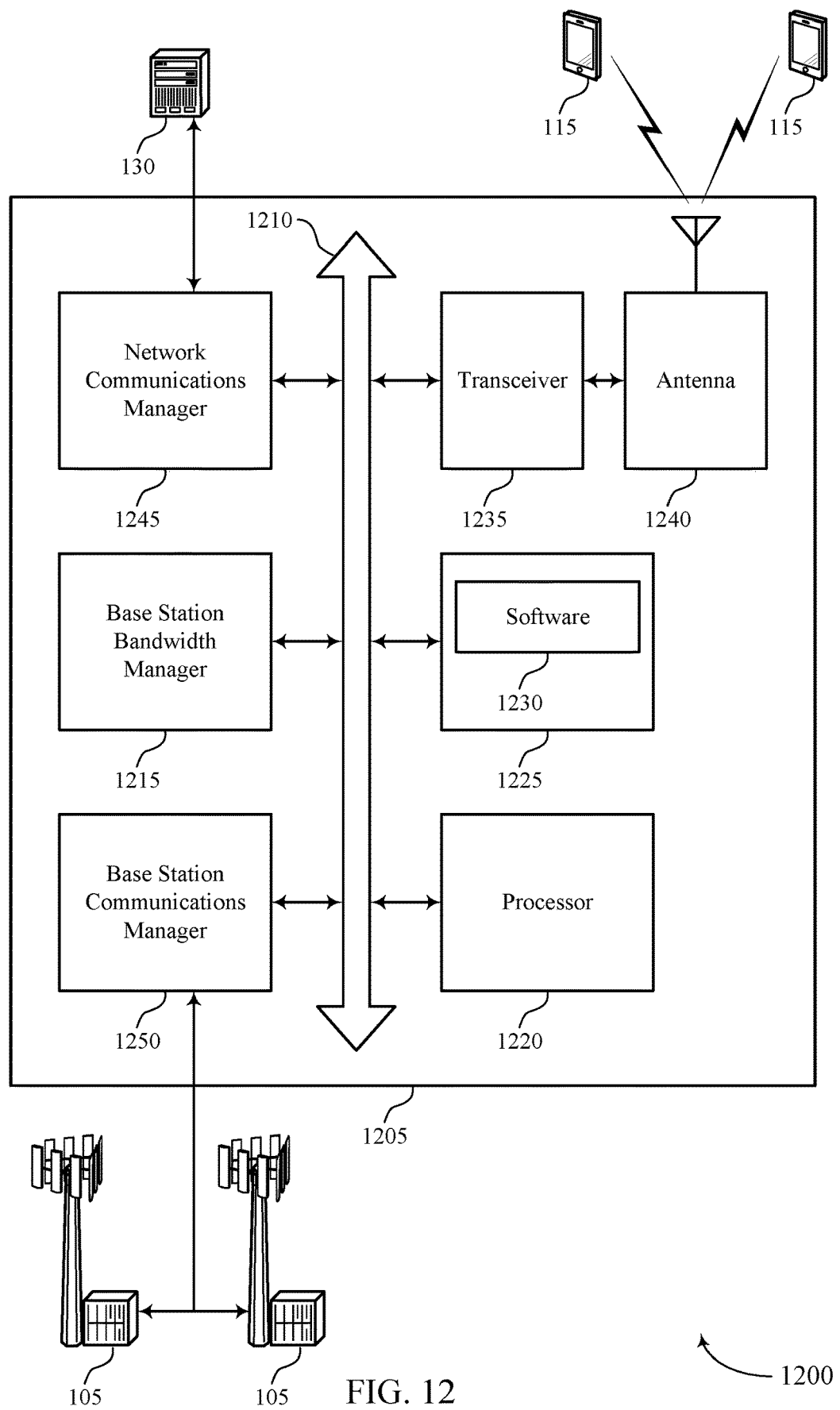
FIG. 12 illustrates a block diagram of a system including a base station that supports bandwidth selection for eMTC communications in accordance with aspects of the present disclosure.

FIG. 12 shows a diagram of a system 1200 including a device 1205 that supports bandwidth selection for eMTC communications in accordance with various aspects of the present disclosure. Device 1205 may be an example of or include the components of base station 105 as described above, e.g., with reference to FIGS. 1 through 4. Device 1205 may include components for bi-directional voice and data communications including components for transmitting and receiving communications, including a base station bandwidth manager 1215, a processor 1220, a memory 1225, a software 1230, a transceiver 1235, an antenna 1240, a network communications manager 1245, and a base station communications manager 1250. These components may be in electronic communication via one or more busses (e.g., bus 1210). Device 1205 may communicate wirelessly with one or more UEs 115.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting bandwidth selection for eMTC communications).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware and/or software operation such as the interaction with peripheral components or devices.

Software 1230 may include code to implement aspects of the present disclosure, including code to support bandwidth selection for eMTC communications. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

Network communications manager 1245 may manage communications with the core network (e.g., via one or more wired backhaul links). For example, the network communications manager 1245 may manage the transfer of data communications for client devices, such as one or more UEs 115.

Base station communications manager 1250 may manage communications with other base station 105, and may include a controller or scheduler for controlling communications with UEs 115 in cooperation with other base stations 105. For example, the base station communications manager 1250 may coordinate scheduling for transmissions to UEs 115 for various interference mitigation techniques such as beamforming or joint transmission. In some examples, base station communications manager 1250 may provide an X2 interface within an LTE/LTE-A wireless communication network technology to provide communication between base stations 105.

Figure 13:
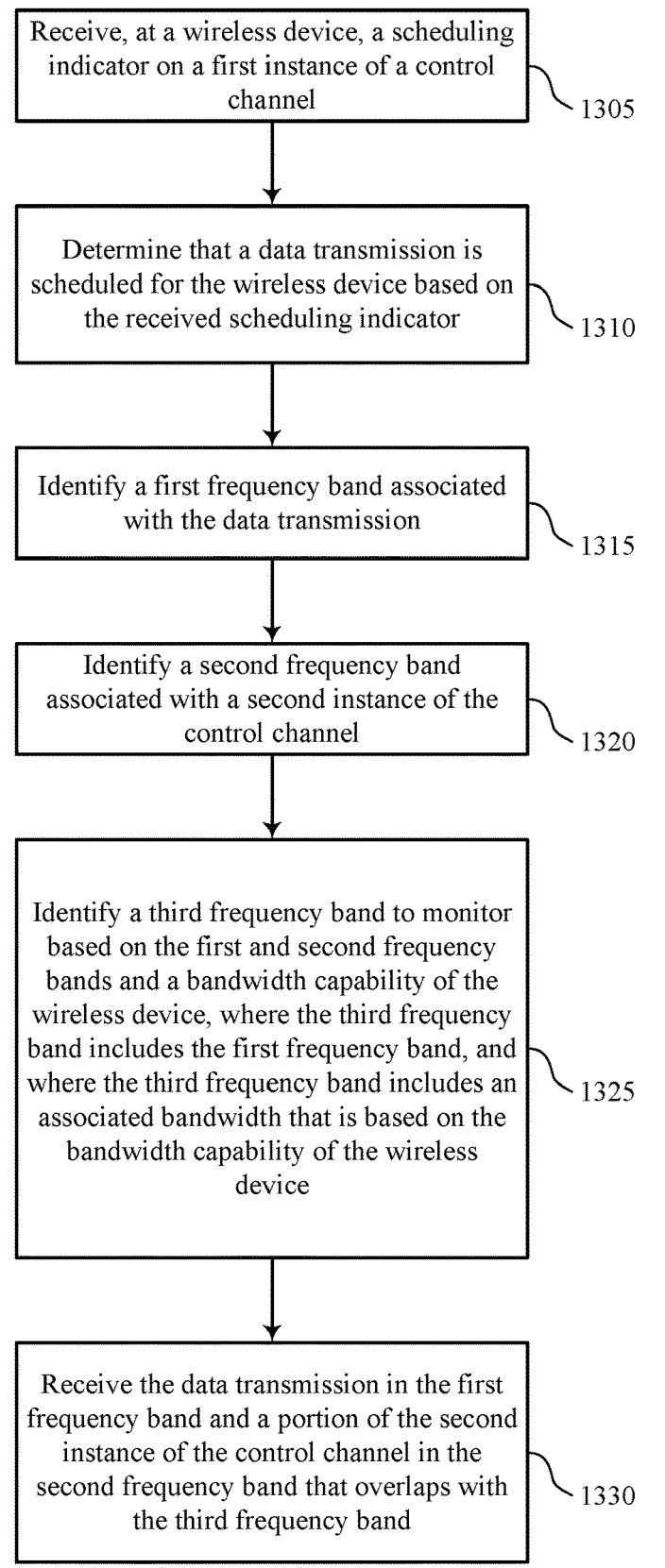
FIGS. 13 through 15 illustrate methods for bandwidth selection for eMTC communications in accordance with aspects of the present disclosure.

FIG. 13 shows a flowchart illustrating a method 1300 for bandwidth selection for eMTC communications in accordance with various aspects of the present disclosure. The operations of method 1300 may be implemented by a UE 115 or its components as described herein. For example, the operations of method 1300 may be performed by a UE bandwidth manager as described with reference to FIGS. 5 through 8. In some examples, a UE 115 may execute a set of codes to control the functional elements of the device to perform the functions described below. Additionally or alternatively, the UE 115 may perform aspects of the functions described below using special-purpose hardware.

At block 1305 the UE 115 may receive, at a wireless device, a scheduling indicator on a first instance of a control channel. The operations of block 1305 may be performed according to the methods described with reference to FIGS. 1 through 4. In certain examples, aspects of the operations of block 1305 may be performed by a data transmission manager as described with reference to FIGS. 5 through 8.

At block 1310 the UE 115 may determine that a data transmission is scheduled for the wireless device based at least in part on the received scheduling indicator. The operations of block 1310 may be performed according to the methods described with reference to FIGS. 1 through 4. In certain examples, aspects of the operations of block 1310 may be performed by a data transmission manager as described with reference to FIGS. 5 through 8.

At block 1315 the UE 115 may identify a first frequency band associated with the data transmission. The operations of block 1315 may be performed according to the methods described with reference to FIGS. 1 through 4. In certain examples, aspects of the operations of block 1315 may be performed by a data transmission manager as described with reference to FIGS. 5 through 8.

At block 1320 the UE 115 may identify a second frequency band associated with a second instance of the control channel. The operations of block 1320 may be performed according to the methods described with reference to FIGS. 1 through 4. In certain examples, aspects of the operations of block 1320 may be performed by a control channel manager as described with reference to FIGS. 5 through 8.

At block 1325 the UE 115 may identify a third frequency band to monitor based at least in part on the first and second frequency bands and a bandwidth capability of the wireless device, wherein the third frequency band includes the first frequency band, and wherein the third frequency band comprises an associated bandwidth that is based at least in part on the bandwidth capability of the wireless device. The operations of block 1325 may be performed according to the methods described with reference to FIGS. 1 through 4. In certain examples, aspects of the operations of block 1325 may be performed by a control channel manager as described with reference to FIGS. 5 through 8.

At block 1330 the UE 115 may receive the data transmission in the first frequency band and a portion of the second instance of the control channel in the second frequency band that overlaps with the third frequency band. The operations of block 1330 may be performed according to the methods described with reference to FIGS. 1 through 4. In certain examples, aspects of the operations of block 1330 may be performed by a transmission reception manager as described with reference to FIGS. 5 through 8.

Figure 14:
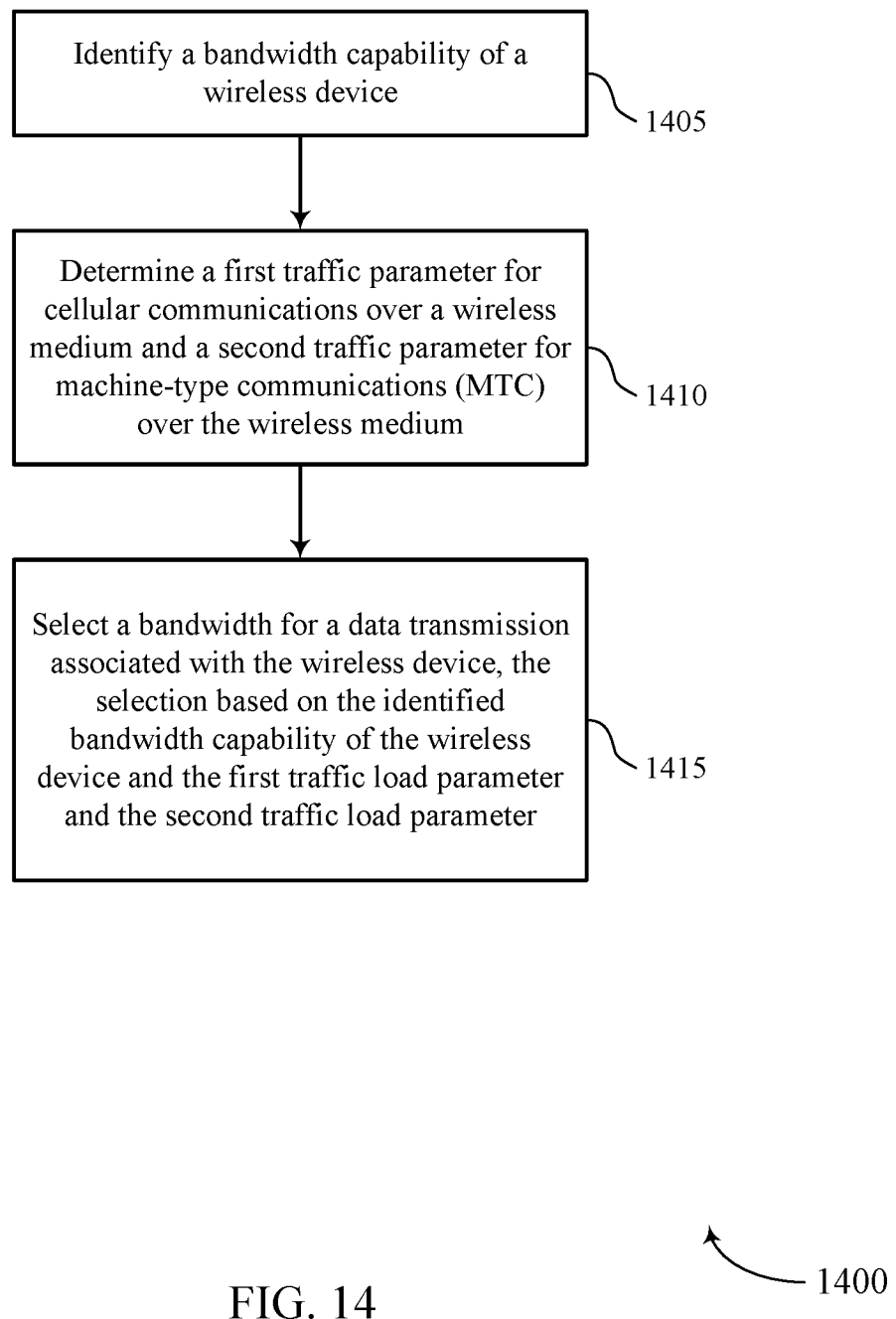

FIG. 14 shows a flowchart illustrating a method 1400 for bandwidth selection for eMTC communications in accordance with various aspects of the present disclosure. The operations of method 1400 may be implemented by a base station 105 or its components as described herein. For example, the operations of method 1400 may be performed by a base station bandwidth manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify a bandwidth capability of a wireless device. The operations of block 1405 may be performed according to the methods described with reference to FIGS. 1 through 4. In certain examples, aspects of the operations of block 1405 may be performed by a bandwidth manager as described with reference to FIGS. 9 through 12.

At block 1410 the base station 105 may determine a first traffic parameter for cellular communications over a wireless medium and a second traffic parameter for MTC over the wireless medium. The operations of block 1410 may be performed according to the methods described with reference to FIGS. 1 through 4. In certain examples, aspects of the operations of block 1410 may be performed by a traffic parameter manager as described with reference to FIGS. 9 through 12.

At block 1415 the base station 105 may select a bandwidth for a data transmission associated with the wireless device, the selection based at least in part on the identified bandwidth capability of the wireless device and the first traffic load parameter and the second traffic load parameter. The operations of block 1415 may be performed according to the methods described with reference to FIGS. 1 through 4. In certain examples, aspects of the operations of block 1415 may be performed by a bandwidth manager as described with reference to FIGS. 9 through 12.

Figure 15:
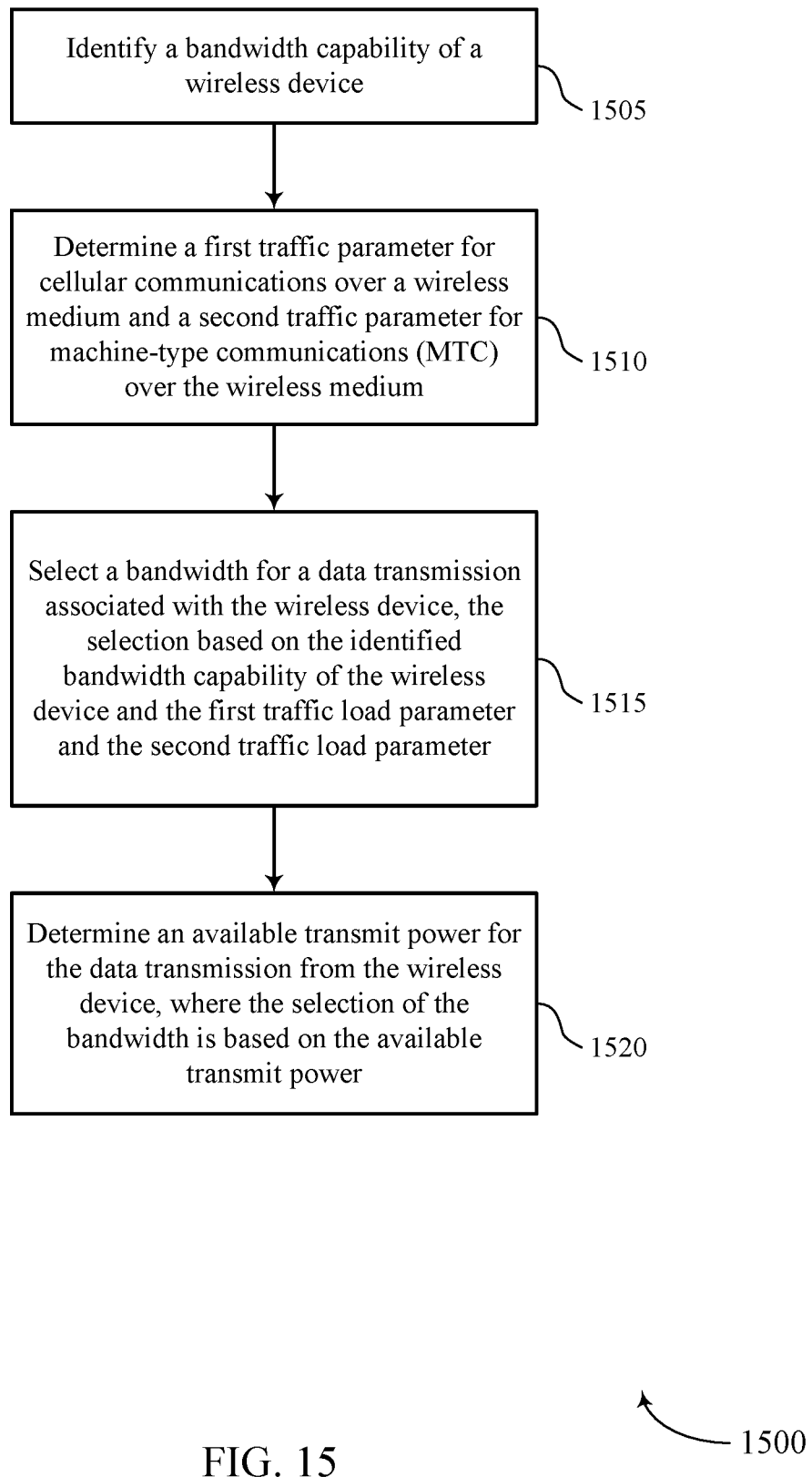

FIG. 15 shows a flowchart illustrating a method 1500 for bandwidth selection for eMTC communications in accordance with various aspects of the present disclosure. The operations of method 1500 may be implemented by a base station 105 or its components as described herein. For example, the operations of method 1500 may be performed by a base station bandwidth manager as described with reference to FIGS. 9 through 12. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may identify a bandwidth capability of a wireless device. The operations of block 1505 may be performed according to the methods described with reference to FIGS. 1 through 4. In certain examples, aspects of the operations of block 1505 may be performed by a bandwidth manager as described with reference to FIGS. 9 through 12.

At block 1510 the base station 105 may determine a first traffic parameter for cellular communications over a wireless medium and a second traffic parameter for MTC over the wireless medium. The operations of block 1510 may be performed according to the methods described with reference to FIGS. 1 through 4. In certain examples, aspects of the operations of block 1510 may be performed by a traffic parameter manager as described with reference to FIGS. 9 through 12.

At block 1515 the base station 105 may select a bandwidth for a data transmission associated with the wireless device, the selection based at least in part on the identified bandwidth capability of the wireless device and the first traffic load parameter and the second traffic load parameter. The operations of block 1515 may be performed according to the methods described with reference to FIGS. 1 through 4. In certain examples, aspects of the operations of block 1515 may be performed by a bandwidth manager as described with reference to FIGS. 9 through 12.

At block 1520 the base station 105 may determine an available transmit power for the data transmission from the wireless device, wherein the selection of the bandwidth is based at least in part on the available transmit power. The operations of block 1520 may be performed according to the methods described with reference to FIGS. 1 through 4. In certain examples, aspects of the operations of block 1520 may be performed by a transmit power manager as described with reference to FIGS. 9 through 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communication systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP LTE and LTE-A are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communication system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communication system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communication system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a bandwidth capability of a wireless device;
   determining a first traffic load parameter for cellular communications over a wireless medium and a second traffic load parameter for machine-type communications (MTC) over the wireless medium; and
   selecting between a narrowband bandwidth and a wideband bandwidth for a data transmission associated with the wireless device, wherein the selecting comprises selecting the narrowband bandwidth in accordance with the identified bandwidth capability of the wireless device, the first traffic load parameter, the second traffic load parameter, at least one of an available transmit power or a pathloss value associated with the wireless device satisfying a threshold value, and an available number of resource blocks for the data transmission being below a threshold number of resource blocks for selecting the narrowband bandwidth.

2. The method of claim 1, further comprising:
   determining the available transmit power for the data transmission from the wireless device.

3. The method of claim 2, wherein the selection of the narrowband bandwidth is based at least in part on the determined available transmit power.

4. The method of claim 1, further comprising:
determining the pathloss value associated with the wireless device.

5. The method of claim 1, further comprising:
determining that one of the available transmit power or the pathloss value associated with the wireless device is below the threshold value.

6. An apparatus for wireless communication, in a system comprising: a processor; memory in electronic communication with the processor; and instructions stored in the memory and operable, when executed by the processor, to cause the apparatus to:
identify a bandwidth capability of a wireless device;
determine a first traffic load parameter for cellular communications over a wireless medium and a second traffic load parameter for machine-type communications (MTC) over the wireless medium; and
select between a narrowband bandwidth and a wideband bandwidth for a data transmission associated with the wireless device, wherein the selecting comprises selecting the narrowband bandwidth in accordance with the identified bandwidth capability of the wireless device, the first traffic load parameter, the second traffic load parameter, at least one of an available transmit power or a pathloss value associated with the wireless device satisfying a threshold value, and an available number of resource blocks for the data transmission being below a threshold number of resource blocks for selecting the narrowband bandwidth.

7. The apparatus of claim 6, wherein the instructions are further executable by the processor to:
determine the available transmit power for the data transmission from the wireless device.

8. The apparatus of claim 7, wherein the selection of the narrowband bandwidth is based at least in part on the determined available transmit power.

9. The apparatus of claim 6, wherein the instructions are further executable by the processor to:
determine the pathloss value associated with the wireless device.

10. The apparatus of claim 6, wherein the instructions are further executable by the processor to:
determine that one of the available transmit power or the pathloss value associated with the wireless device is below the threshold value.

11. An apparatus for wireless communication, comprising:
means for identifying a bandwidth capability of a wireless device;
means for determining a first traffic load parameter for cellular communications over a wireless medium and a second traffic load parameter for machine-type communications (MTC) over the wireless medium; and
means for selecting between a narrowband bandwidth and a wideband bandwidth for a data transmission associated with the wireless device, wherein the selecting comprises selecting the narrowband bandwidth in accordance with the identified bandwidth capability of the wireless device, the first traffic load parameter, the second traffic load parameter, at least one of an available transmit power or a pathloss value associated with the wireless device satisfying a threshold value, and an available number of resource blocks for the data transmission being below a threshold number of resource blocks for selecting the narrowband bandwidth.

12. The apparatus of claim 11, further comprising:
means for determining the available transmit power for the data transmission from the wireless device.

13. The apparatus of claim 12, wherein the selection of the narrowband bandwidth is based at least in part on the determined available transmit power.

14. The apparatus of claim 11, further comprising:
means for determining the pathloss value associated with the wireless device.

15. The apparatus of claim 11, further comprising:
means for determining that one of the available transmit power or the pathloss value associated with the wireless device is below the threshold value.

16. A non-transitory computer-readable medium storing code for wireless communications by a first user equipment (UE), the code comprising instructions executable by a processor to:
identify a bandwidth capability of a wireless device;
determine a first traffic load parameter for cellular communications over a wireless medium and a second traffic load parameter for machine-type communications (MTC) over the wireless medium; and
select between a narrowband bandwidth and a wideband bandwidth for a data transmission associated with the wireless device, wherein the selecting comprises selecting the narrowband bandwidth in accordance with the identified bandwidth capability of the wireless device, the first traffic load parameter, the second traffic load parameter, at least one of an available transmit power or a pathloss value associated with the wireless device satisfying a threshold value, and an available number of resource blocks for the data transmission being below a threshold number of resource blocks for selecting the narrowband bandwidth.

17. The non-transitory computer-readable medium of claim 16, wherein the instructions are further executable by the processor to:
determine the available transmit power for the data transmission from the wireless device.

18. The non-transitory computer-readable medium of claim 17, wherein the selection of the narrowband bandwidth is based at least in part on the determined available transmit power.

19. The non-transitory computer-readable medium of claim 16, wherein the instructions are further executable by the processor to:
determine the pathloss value associated with the wireless device.

20. The non-transitory computer-readable medium of claim 16, wherein the instructions are further executable by the processor to:
determine that one of the available transmit power or the pathloss value associated with the wireless device is below the threshold value.

* * * * *